(12) United States Patent
Schaeffer et al.

(10) Patent No.: US 6,695,264 B2
(45) Date of Patent: Feb. 24, 2004

(54) POWER LEVER TACTILE CUEING SYSTEM

(75) Inventors: Joseph M. Schaeffer, Cedar Hill, TX (US); David W. King, Southlake, TX (US); Anil Mehra, Grapevine, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 10/276,114

(22) PCT Filed: May 16, 2001

(86) PCT No.: PCT/US01/15933

§ 371 (c)(1),
(2), (4) Date: Nov. 12, 2002

(87) PCT Pub. No.: WO01/89926

PCT Pub. Date: Nov. 29, 2001

(65) Prior Publication Data

US 2003/0094539 A1 May 22, 2003

Related U.S. Application Data

(60) Provisional application No. 60/204,909, filed on May 16, 2000.

(51) Int. Cl.[7] ................................................ B64C 13/14
(52) U.S. Cl. .................... 244/223; 244/66; 244/12.4; 701/14
(58) Field of Search ................................ 244/223, 221, 244/66, 12.4; 701/3, 14

(56) References Cited

U.S. PATENT DOCUMENTS

| 5,062,594 | A | * | 11/1991 | Repperger ................... 244/175 |
| 5,076,517 | A | * | 12/1991 | Ferranti et al. ............. 244/228 |
| 5,337,974 | A | * | 8/1994 | Rumberger et al. ........... 244/49 |
| 5,853,152 | A | * | 12/1998 | Evans et al. ................. 244/221 |

* cited by examiner

Primary Examiner—J. Woodrow Eldred
(74) Attorney, Agent, or Firm—James E. Walton

(57) ABSTRACT

The present invention is a power lever tactile cueing system for providing tactile alerts to pilots as operational limits of an aircraft are approached. The cueing system generates a tactile cue comprising a variable dive rate and a variable friction force on a power lever of an aircraft. The cueing system provides spring-like tactile cues when power commands reach a predetermined operating limit, without the use of mechanical springs. The cueing system trims down the power lever position and provides the additional friction force based upon aircraft and engine state. The cueing system remains activated until the aircraft is again operated within its operational limits. The pilot may override the cueing system in certain situations.

20 Claims, 14 Drawing Sheets

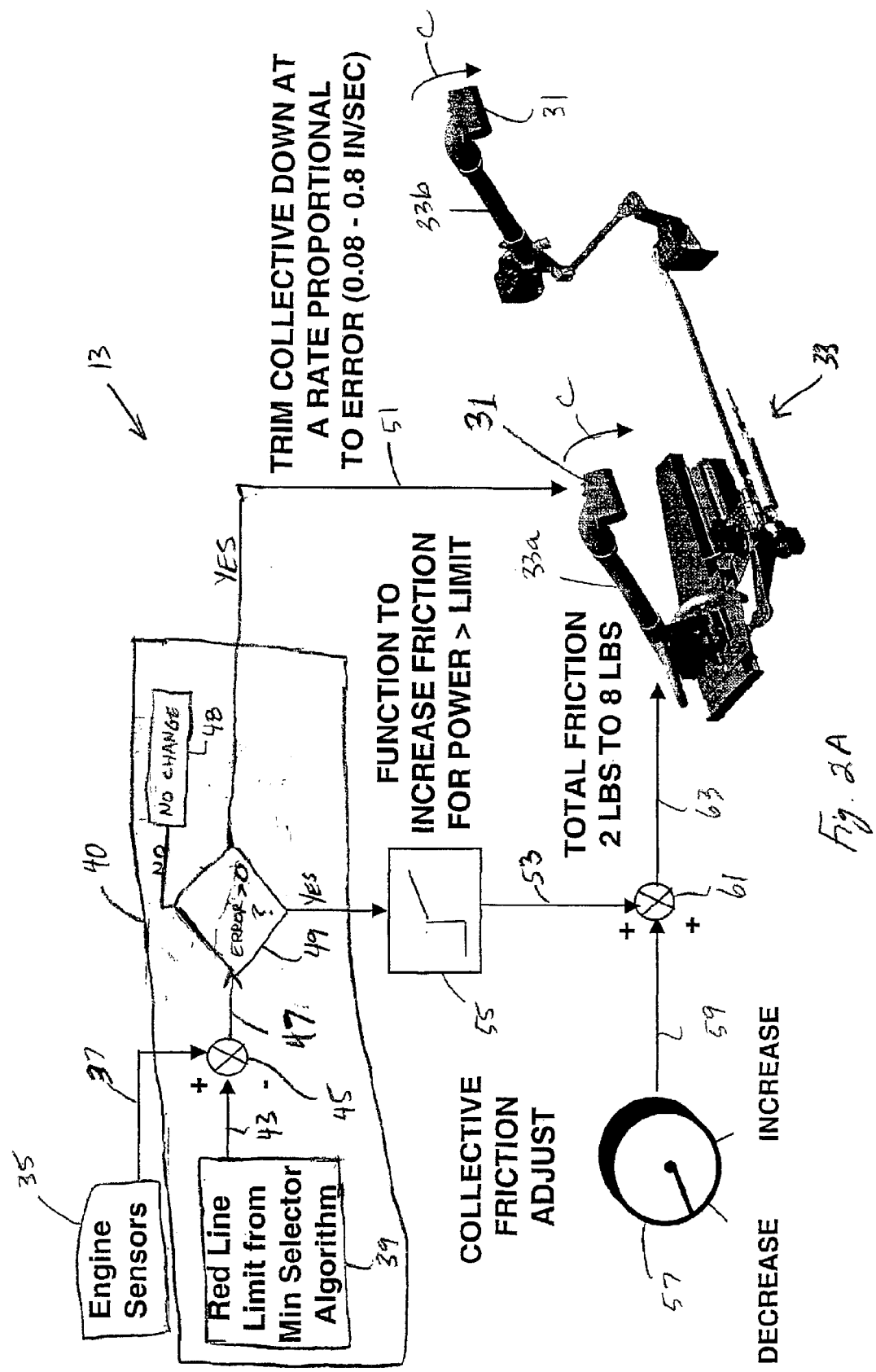

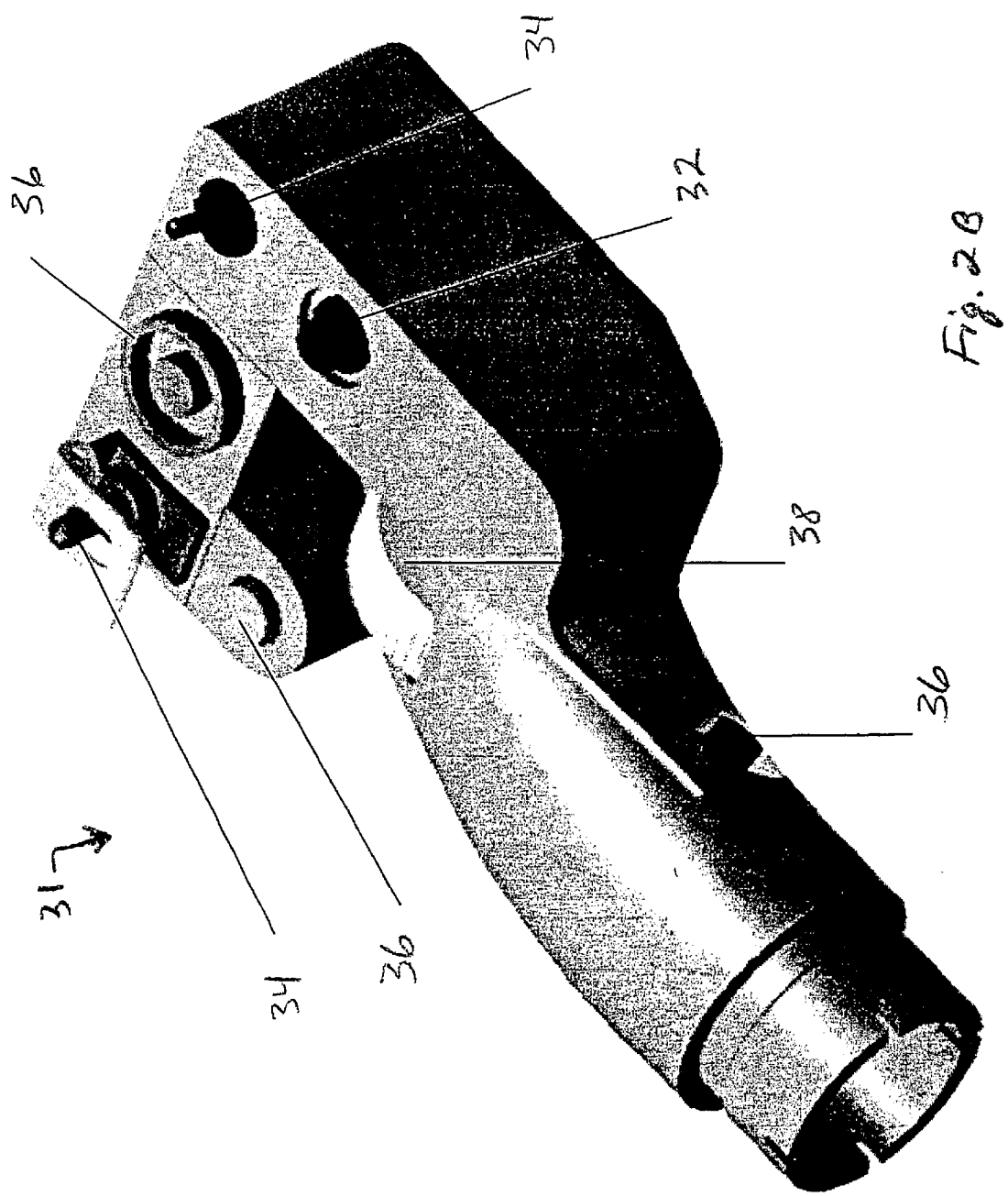

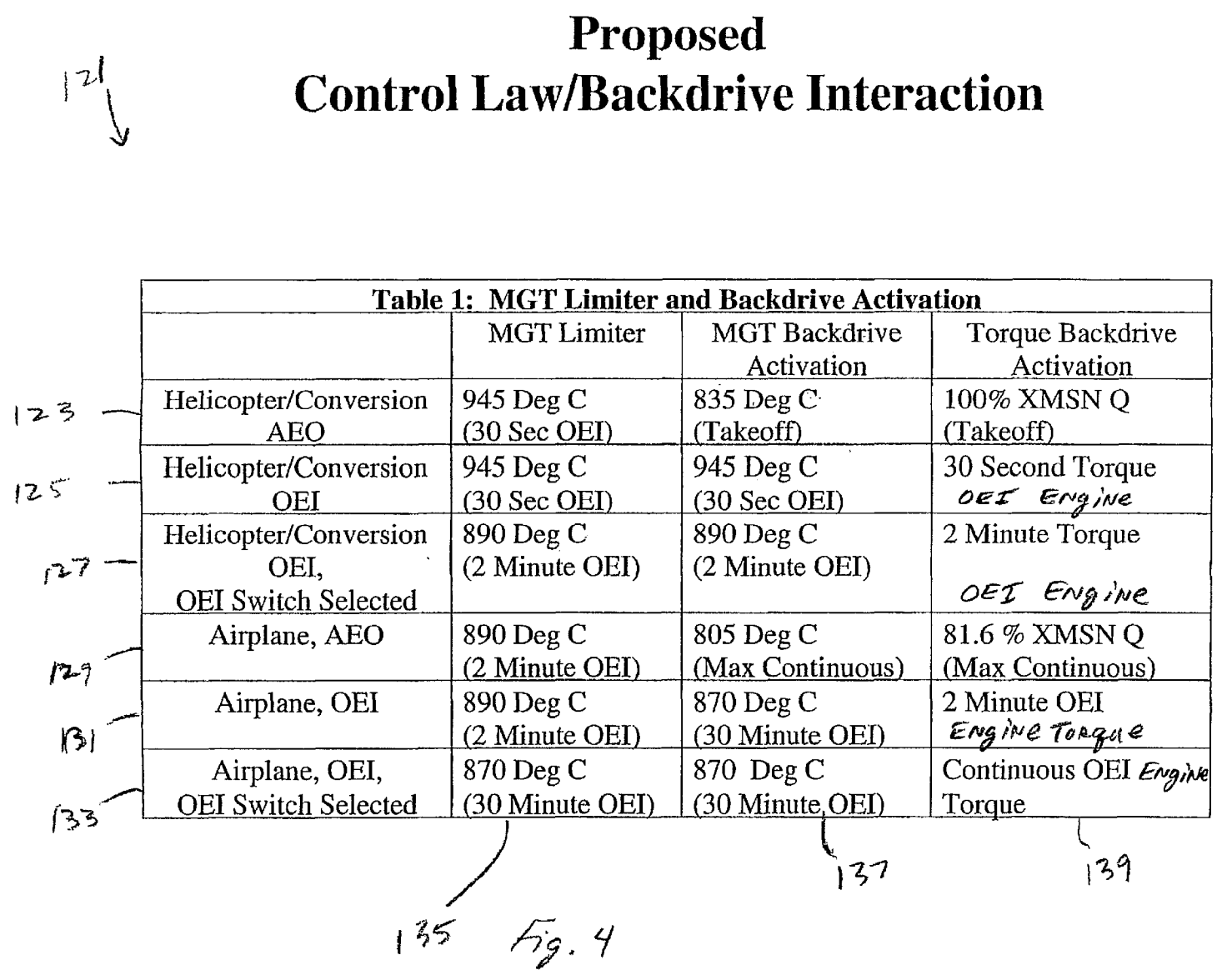

Proposed
Control Law/Backdrive Interaction

Table 1: MGT Limiter and Backdrive Activation

| | MGT Limiter | MGT Backdrive Activation | Torque Backdrive Activation |
|---|---|---|---|
| Helicopter/Conversion AEO | 945 Deg C (30 Sec OEI) | 835 Deg C (Takeoff) | 100% XMSN Q (Takeoff) |
| Helicopter/Conversion OEI | 945 Deg C (30 Sec OEI) | 945 Deg C (30 Sec OEI) | 30 Second Torque OEI Engine |
| Helicopter/Conversion OEI, OEI Switch Selected | 890 Deg C (2 Minute OEI) | 890 Deg C (2 Minute OEI) | 2 Minute Torque OEI Engine |
| Airplane, AEO | 890 Deg C (2 Minute OEI) | 805 Deg C (Max Continuous) | 81.6 % XMSN Q (Max Continuous) |
| Airplane, OEI | 890 Deg C (2 Minute OEI) | 870 Deg C (30 Minute OEI) | 2 Minute OEI Engine Torque |
| Airplane, OEI, OEI Switch Selected | 870 Deg C (30 Minute OEI) | 870 Deg C (30 Minute OEI) | Continuous OEI Engine Torque |

Fig. 4

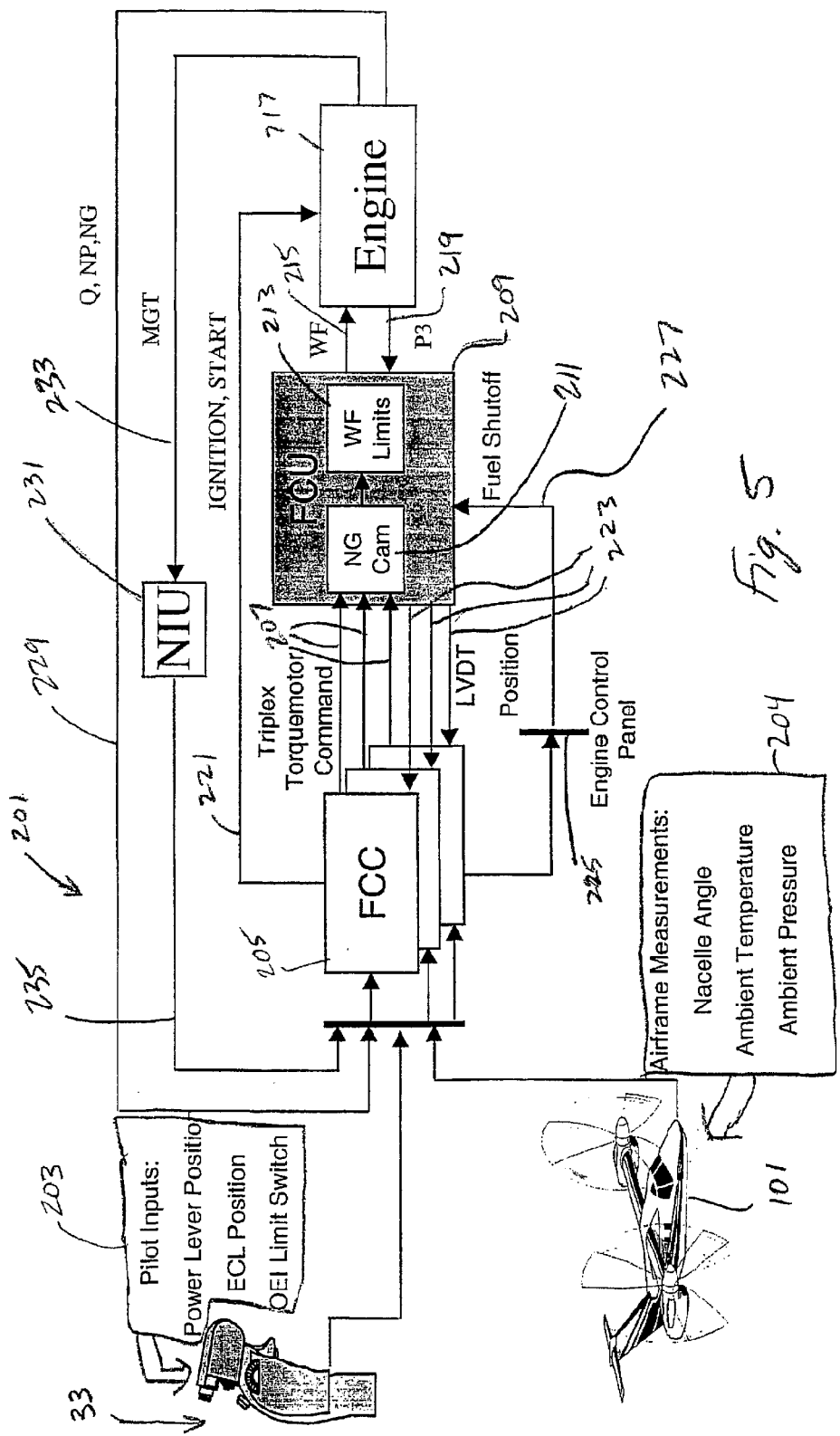

POWER LEVER TACTILE CUEING SYSTEM

This applications claims the benefit of provisional application No. 60/204,909 filed May 16, 2000.

TECHNICAL FIELD

The present invention relates generally to pilot cueing systems for aircraft. In particular, the present invention relates to tactile pilot cueing systems for the power levers, collectives, and throttles of aircraft.

DESCRIPTION OF THE PRIOR ART

Flying an aircraft is a complicated and demanding task. The pilot must be aware of many things going on at once. In particular, the pilot must be aware of the ever-changing operating conditions of the aircraft and all of its systems, such as the power systems and the flight control systems. The pilot must know not only the current state of these systems, but their operational limits as well. To do this, the pilot must scan multiple engine and torque gauges to determine operating conditions and limitations. Failure by the pilot to carefully monitor these systems can lead to serious problems. The following are examples of problems that can result from the pilot failing to monitor the operational parameters of the aircraft: (1) increased operational and maintenance costs as a result of inadvertent power commands in excess of torque or temperature limits; and (2) unpredictable vertical axis control as a result of a power lever deadzone during operations with limited engine power, such as one-engine-inoperative (OEI) flight conditions.

Some aircraft use mechanical springs to provide a tactile cue to the pilot through the control levers to indicate that the operational limits of the aircraft are being approached. Such mechanical springs engage at set predetermined levels and supply a predetermined amount of resisting force to the controls. These preset levels cannot be changed once the springs are installed. Furthermore, these mechanical springs add weight to the aircraft.

SUMMARY OF THE INVENTION

There is a need for a power lever tactile cueing system for an aircraft for which the magnitude of the tactile force can be altered depending upon certain dynamic conditions of the aircraft, and for which mechanical springs are not required.

Therefore, it is an object of the present invention to provide a power lever tactile cueing system for an aircraft for which the magnitude of the tactile force can be altered depending upon certain dynamic conditions of the aircraft, and for which mechanical springs are not required.

The above objects are achieved by providing a power lever tactile cueing system in which mechanical springs are replaced by computer controlled software, a variable friction magnetic particle clutch, and an electric trim motor. In the preferred embodiment of the present invention, the following tactile alerts are employed: a power lever softstop and a power lever backdrive. These tactile alerts provide a spring-like tactile cue when power commands reach a predetermined operating limit. The backdrive commands cause the power lever to be trimmed down at a variable rate based upon the operating conditions of the aircraft and the engines. The tactile cue remains active until the aircraft and engine conditions no longer exceed the operational limits. The pilot can deliberately override the tactile cue in an emergency situation.

The present invention provides the following advantages: (1) reduces pilot workload by allowing the pilot to determine operating limits without continually monitoring multiple engine and drive system gauges in the cockpit; (2) improves flight safety by reducing the likelihood of exceeding engine and drive system operating limits; (3) improves operational costs by reducing the likelihood of engine and drive system overhauls resulting from inadvertent exceedances of operational limits; (4) improves flight safety by allowing the pilot to override normal operational limits, but not allowing the pilot to override structural design static limits; (5) improves aircraft performance during maximum gross weight vertical takeoffs by allowing the pilot to set power to 100% of the operating limit without continually monitoring multiple engine and drive system gauges; (6) reduces pilot workload following an engine failure by automatically eliminating control deadzone in the power lever when operating on an engine limit; (7) provides a low-weight implementation of the tactile cue by using the same equipment required for autopilot operation; (8) provides an immediate tactile cue to the pilot that the aircraft has become power-limited as a result of a propulsion system malfunction; (9) eliminates the requirement for the pilot to manually modulate the power lever when power limits change as a function of flight condition; and (10) reduces weight by eliminating the need for mechanical springs.

The above objects and advantages, as well as others, will be evident from the following detailed description of the present invention.

BRIEF DESCRIPTION OF THE DRAWINGS

FIG. 4 is a tabular representation of the control law and backdrive interaction for the power lever tactile cueing system of the present invention.

DESCRIPTION OF THE PREFERRED EMBODIMENT

Figure 1:
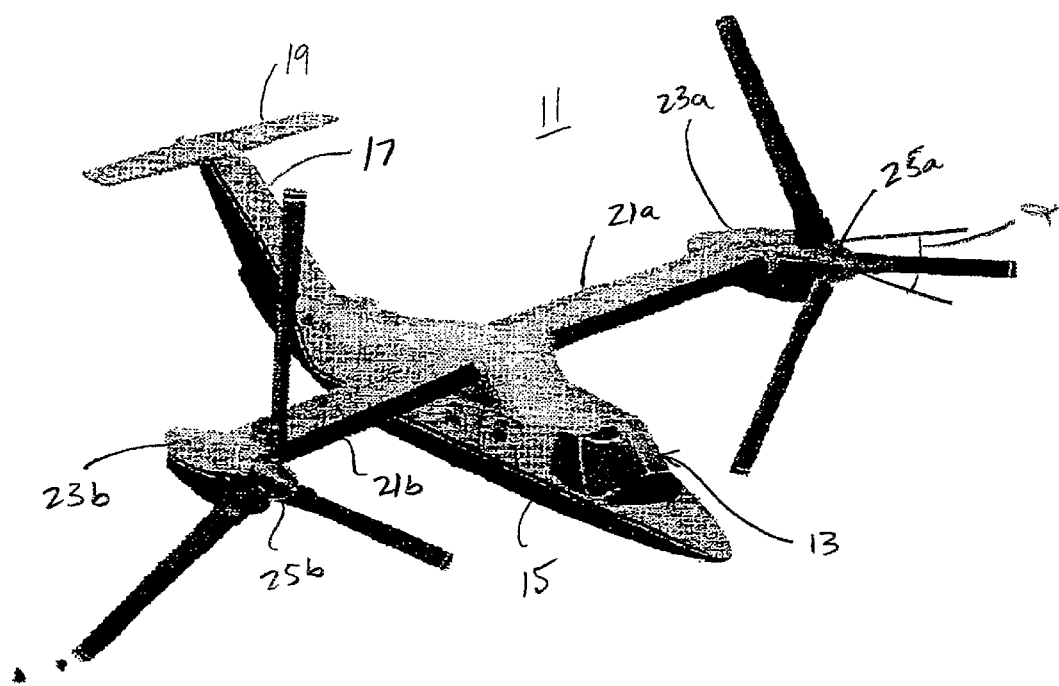
FIG. 1 is a perspective view of a tiltrotor aircraft having a power lever tactile cueing system according to the present invention.

Referring to FIG. 1 in the drawings, a tiltrotor aircraft 11 having a power lever tactile cueing system 13 according to the present invention is illustrated. Tiltrotor aircraft 11 comprises the following components: a fuselage 15, a tail section 17 coupled to the aft portion of fuselage 15, a horizontal stabilizer 19 carried by tail section 17, a left wing member 21a coupled to fuselage 15, a right wing member 21b coupled to fuselage 15, a left engine nacelle 23a pivotally coupled to left wing member 21a, a right engine nacelle 23b pivotally coupled to right wing member 21b, a left engine and prop rotor gear box (not shown) carried by left engine nacelle 23a, a right engine and prop rotor gear box (not shown) carried by right engine nacelle 23b, a left prop rotor 25a coupled to left engine and prop rotor gear box, and a right prop rotor 25b coupled to right engine and prop rotor gear box. Tiltrotor aircraft 11 can operate in either an airplane mode, in which aircraft 11 flies like a fixed wing aircraft, or in a helicopter mode, in which aircraft 11 can take off, fly, land, and hover like a helicopter or other rotary wing aircraft. In FIG. 1, tiltrotor aircraft 11 is shown in the airplane mode. Although the preferred embodiment of the present invention is in a tiltrotor aircraft application, it should be understood that the present invention may be used on a wide variety of aircraft.

In the preferred embodiment, cueing system 13 is utilized in aircraft 11 to generate a tactile cue to a pilot through the aircraft's power lever in response to certain flight conditions. Because the present invention is particularly well suited for a tiltrotor aircraft application, the present invention will be described with regard to tiltrotor aircraft 11. However, it should be understood that cueing system 11 may be used in other applications involving the movement of a power lever, collective, or throttle to control power limits.

Figure 2B:
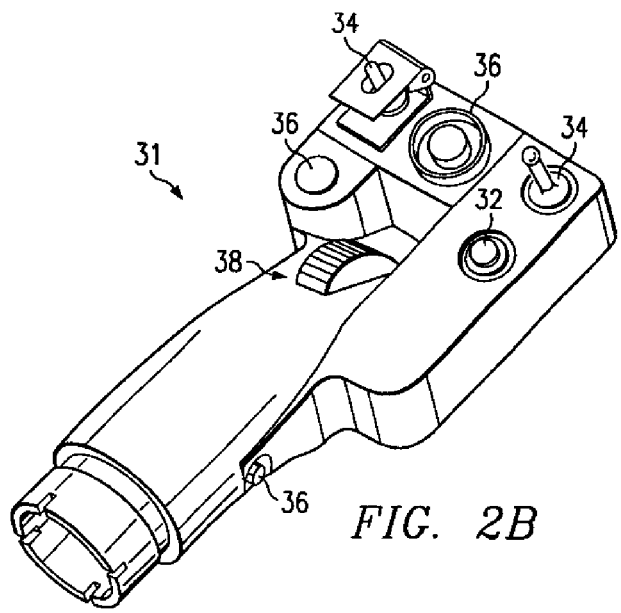
FIG. 2B is a perspective view of a power lever grip for the power lever tactile cueing system of the present invention.
Figure 2A:
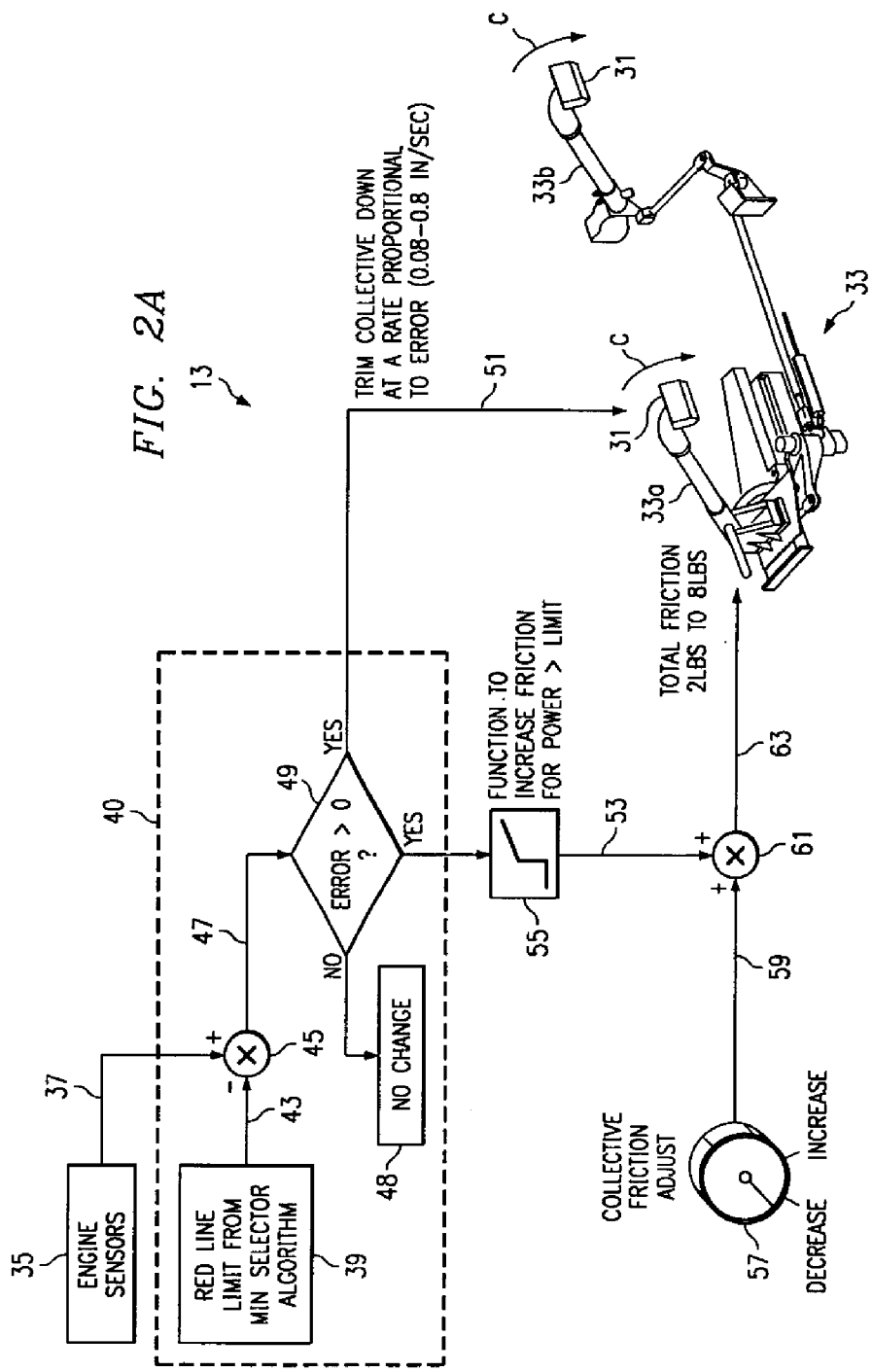
FIG. 2A is a schematic of the power lever tactile cueing system of the present invention.

Referring now to FIG. 2A in the drawings, power lever tactile cueing system 13 is shown in a schematic view. According to the present invention, a tactile force cue, represented by arrow C, is provided on a power lever 33 of aircraft 11 when flight control computers (FCC's) 205 (see FIG. 4) and cueing system 13 detect that aircraft 11 has reached or is approaching an engine or drive system operating limit. Power lever 33 in aircraft 11 is synonymous with the collective in a helicopter, or the throttle in a fixed wing aircraft. Cueing system 13 includes a plurality of engine sensors 35 disposed at various locations throughout aircraft 11. In the preferred embodiment, engine sensors 35 provide sensor signals 37 which correspond to certain operating parameters, such as engine torque, transmission torque, measured gas temperature, and/or nacelle angle.

A backdrive command selector 40 receives sensor signals 37 from engine sensors 35 and generates tactile cue C. Backdrive command selector 40 includes a plurality of "red line" limit algorithms 39 which calculate certain operational limits of aircraft 11. Backdrive command selector 40 is a component of an overall tactile cue command algorithm 41 (see FIG. 3). Tactile command algorithm 41 includes compensation to account for engine dynamics, aircraft dynamics, and system latency. An algorithm signal 43 corresponds to each red line limit algorithm 39. Sensor signals 37 and algorithm signals 43 are compared by a comparator 45. Comparator 45 generates a power limit error signal 47 by comparing the corresponding value of algorithm signals 43 with the corresponding value of sensor signals 37. The value of power limit error signal 47 is queried at block 49, and a result of "YES" or "NO" is returned. If the value of power limit error signal 47 is less than or equal to zero, then cueing system 13 has no effect on power lever 33, as is shown by the "NO" result and block 48. On the other hand, if the value of power limit error signal 47 is greater than zero, then tactile cue C is provided on power lever 33, as is shown by the two "YES" results.

Tactile cue C is comprised of two components: a variable drive rate 51 to automatically trim down power lever 33; and a variable friction force 53 that resists pilot commanded motion. For variable drive rate 51, power lever 33 is trimmed down at a rate that is proportional to the corresponding value of power limit error signal 47, the rate being preferably between about 0.08 and 0.8 inches per second. For variable friction force 53, the magnitude of the force is a function of the selected operating conditions of the engine and drive systems of aircraft 11. Variable friction force 53 is calculated by an algorithm in FCC's 205, and preferably simulates a "breakout" force and a "softstop" force, as represented by block 55. The breakout force is a threshold static force that the pilot must overcome before he can begin to move power lever 33. The breakout force is preferably between about 0.0 and 2.0 pounds. The softstop force is an increasing force that the pilot must overcome to continue moving power lever 33 toward a position that exceeds the operational limits of aircraft 11. Because variable friction force 53 is a softstop force, the pilot is allowed to overcome variable friction force 53 and pull power lever 33 through tactile cue C and access emergency power. The softstop force is preferably between about 4.0 and 8.0 pounds. Beyond the softstop force, tactile cue C acts like a mechanical spring. In addition, because cueing system 13 cause an immediate actuation of power lever 33 in response to an engine failure, the present invention reduces pilot workload following an engine failure by automatically eliminating control deadzone in power lever 33 when operating on an engine limit. One notable example of reduced workload is when the pilot switches from a thirty second engine power rating to a two minute engine power rating. Without cueing system 13, the pilot is forced to "hunt" with power lever 33 to eliminate the deadzone, which simulation has shown can take up to seven seconds during a crucial portion of the recovery.

In preparing aircraft 11 for flight, the pilot may preset a baseline friction force 59 for power lever 33 by either increasing or decreasing a preset power lever friction value, as shown in block 57. Typically, baseline friction force 59 is between about 0.0 and 3.0 pounds. Preset friction force 59 is combined with variable friction force 53 at an accumulator 61 to produce a total friction force 63 which is provided on power lever 33. Total friction force 63 is preferably between about 2.0 and 8.0 pounds.

Referring now to FIG. 2B in the drawings, a power lever grip 31 according to the present invention is illustrated. Tiltrotor aircraft 11 includes at least two such power lever grips 31: one coupled to a pilot's power lever 33a, and another coupled to the co-pilot's power lever 33b. Power lever grips 31 are mechanically and electrically coupled to power levers 33a and 33b. Each power lever grip 31 includes a one engine inoperative switch 32 which may be activated by the pilot or co-pilot as necessary under certain conditions. Power lever grip 31 may include additional switches 34, buttons 36, thumbwheels 38, and other control mechanisms for controlling various aircraft functions and maneuvers.

Figure 3:
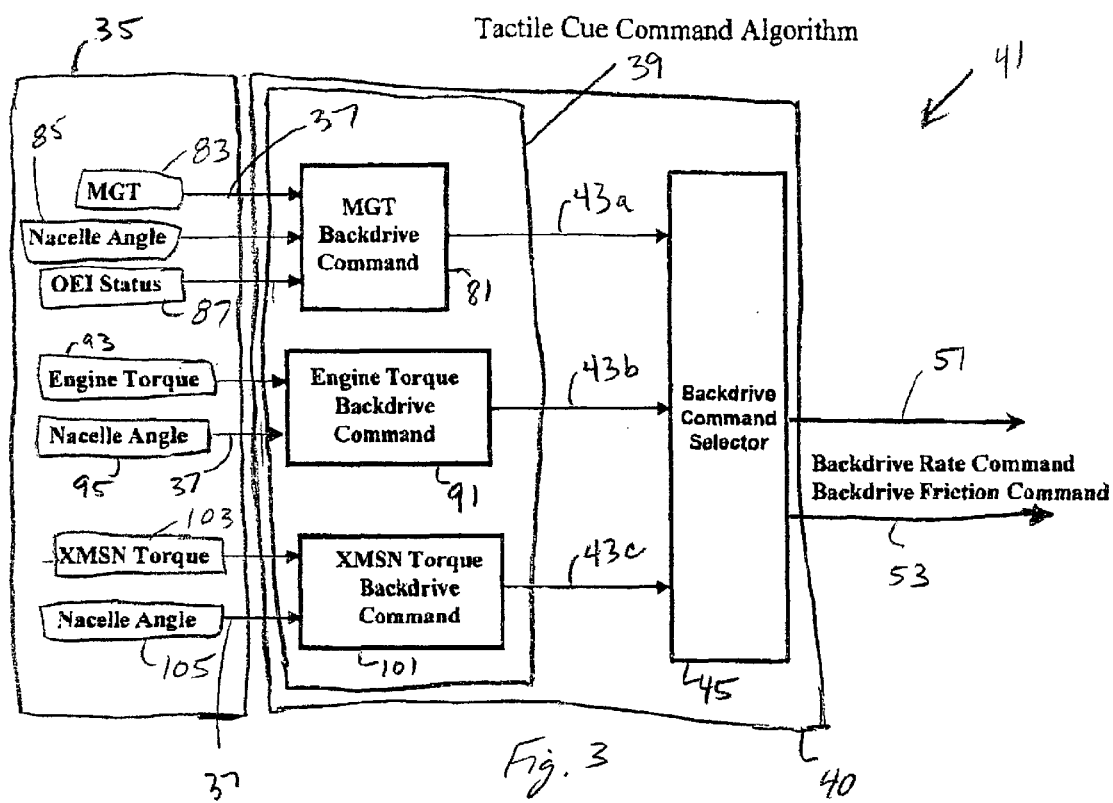
FIG. 3 is a schematic of the command algorithm for the power lever tactile cueing system of the present invention.

Referring now to FIG. 3 in the drawings, tactile cue command algorithm 41 is shown in a schematic view. Tactile cue command algorithm 41 determines the magnitude of multi-component tactile cue C that is generated on power lever 33 of aircraft 11. In the preferred embodiment, the following red line limits are determined: a measured gas temperature red line limit 43a, an engine torque red line limit 43b, and a transmission torque red line limit 43c. Measured gas temperature red line limit 43a is calculated by a measured gas temperature backdrive command algorithm 81 by using a measured gas temperature input 83, a nacelle angle input 85, and a status input 87 for a one-engine-inoperable switch 32 located on power lever 33. Engine torque red line limit 43b is calculated by an engine torque backdrive command algorithm 91 by using an engine torque input 93 and a nacelle angle input 95. Transmission torque red line limit 43c is calculated by a transmission torque backdrive command algorithm 101 by using a transmission torque input 103 and a nacelle angle input 105. It should be understood that other engine and drive system parameters may also be considered in lieu of, in addition to, or in combination with the above parameters. Nacelle angle inputs 85, 95, and 105 are the average angles α (see FIG. 1) between nacelles 23a and 23b and wings 21a and 21b. Inputs 83, 85, 87, 93, 95, 103, and 105 are all passed to tactile cue command algorithm by FCC's 205.

Comparator 45 determines which backdrive command algorithm 81, 91, or 101 is the most critical at any given time, depending upon the actual operating conditions of aircraft 11. Tactile cue command algorithm 41 is used to command tactile cue C based upon the engine or drive system parameter that is most critical relative to that parameter's respective operating limit. For example, an increase in measured gas temperature will increase the likelihood that measured gas temperature backdrive command 81 will be the most critical red line limit 43, but will not increase the likelihood that transmission torque backdrive command 101 will be the most critical red line limit 43. Only the most critical backdrive command, i.e., the backdrive command that is relatively the closet to the actual operational limits, is passed through comparator 45 to be used in the generation of variable drive rate 51 and variable friction force 53 of tactile cue C. Tactile cue C characteristics are varied depending on which parameter exceeds its operating limit. For example, when average mast torque or engine torque exceeds its limit, tactile cue C is a strong spring-type force that provides a resisting force proportional to the error magnitude, plus variable drive rate 53 to return power lever 33 to its limit. For another example, when an engine temperature limit is exceeded, tactile cue C is a force detent, plus a slow drive rate 53 to return power lever 33 to limit.

Power lever 33 includes a "hardstop" position which represents the operational limits of aircraft 11. The hardstop position prevents the pilot from exceeding aircraft structural design static limits. An emergency power condition is provided which can be activated by the pilot if the pilot maintains a selected force on power lever 33 in order to exceed engine operating limits, but the hardstop limits the amount of emergency power available. For example, after an engine failure has occurred, the power lever is automatically driven down at a slow rate when FCC's 205 detect that power lever 33 exceeds the single engine power capability of aircraft 11. The single engine power capability is set at the thirty second engine rating automatically after an engine failure is detected. A one engine inoperative limit switch (not shown) is provided on power lever grip 31 that allows the pilot to switch the single engine power capability from thirty second rating to two minute power rating.

Referring now to FIG. 4 in the drawings, a tabular representation of the control law and backdrive interaction for the power lever tactile cueing system of the present invention is illustrated. The limits shown are based on an exemplary aircraft configuration. A table 121 sets forth some typical operational limits for aircraft 11 which are utilized and generated by tactile cue command algorithm 41. In other words, table 121 represents typical red line limits 43 of tactile cue command algorithm 41. It should be understood that the values in table 121 will change if the configuration of aircraft 11 changes.

Rows 123, 125, and 127 of table 121 represent certain operational limits for aircraft 11 while in either the helicopter mode or while converting from helicopter mode to airplane mode. For row 123, all engines are operative; for row 125, one engine is inoperative; and for row 127, one engine is inoperative and the one engine inoperative switch has been activated. Rows 129, 131, and 133 of table 121 represent certain operational limits for aircraft 11 while in the airplane mode. For row 129, all engines are operative; for row 131, one engine is inoperative; and for row 133, one engine is inoperative and the one engine inoperative switch has been activated.

In FCC's 205, a hard limit exists for measured gas temperature. This hard temperature limit is dependent upon three parameters: measured gas temperature 83, nacelle angle 85, and status of one engine inoperative switch 87. This measured gas temperature limiter is represented by column 135 of table 121. For the situations represented by rows 123 and 125, the measured gas temperature hard limit is set to the thirty second one engine inoperative limit of 945° C., which corresponds to the maximum temperature at which the engine can operate for thirty seconds. While at this temperature, a one engine inoperative warning alert counts down from thirty seconds. For the situation represented by row 127, the measured gas temperature hard limit is equal to the engine two minute one engine inoperative limit of 890° C. and the one engine inoperative warning alert counts down from two minutes. Continuing with the airplane mode situations represented by rows 129 and 131, the measured gas temperature hard limit is 890° C. and the one engine inoperative warning alert counts down from two minutes. For the situation represented by row 133, the measured gas temperature hard limit is equal to the engine thirty minute one engine inoperative limit of 870° C. and the one engine inoperative warning alert counts down from thirty minutes.

However, according to the present invention, tactile cue C is generated through power lever 33 prior to reaching these hard limits. Tactile cue C remains active until the situation is no longer present. Of course, the pilot can override the commands of power lever tactile cueing system 13 if required.

Column 137 represents typical measured gas temperature situations which trigger activation of cueing system 13. For example, for the situation represented by row 123, if during takeoff, the measured gas temperature reaches 835° C., cueing system 13 causes power lever 33 to trim back at a selected variable drive rate 51 (see FIG. 2A). For the situations represented by rows 125 and 127, cueing system 13 is not activated until the hard limit from column 135 is reached. Continuing with the situations in which aircraft 11 is in airplane mode, for the situation represented by row 129, the maximum tactile cueing force is generated when the measured gas temperature exceeds 805° C. For the situations represented by rows 131 and 133, cueing system 13 is not activated until the measured gas temperature exceeds 870° C.

Column 139 represents a combination of engine torque limits and transmission torque limits that, if exceeded, will activate cueing system 13. The tactile cue C is a simulated spring force that is proportional to the exceedance. For the situation represented by row 123, if at takeoff, the transmission torque exceeds the takeoff limit of 100%, then cueing system 13 generates tactile cue C through power lever 33. For the situations represented by rows 125 and 127, once the engine torque has been maintained for the allotted warning time interval, then cueing system 13 is activated. For the airplane mode situation of row 129, if the transmission torque reaches the maximum continuous rating of 81.6%, then cueing system 13 is activated. For the one engine inoperative situation represented by row 131, once the engine torque, reaches the two minute engine torque limit, then cueing system 13 is activated. Finally, for the situation represented by row 133, if the one engine inoperative switch has been activated, cueing system 13 will allow the engine torque to reach the continuous one engine inoperative limit before activating.

Figure 5:
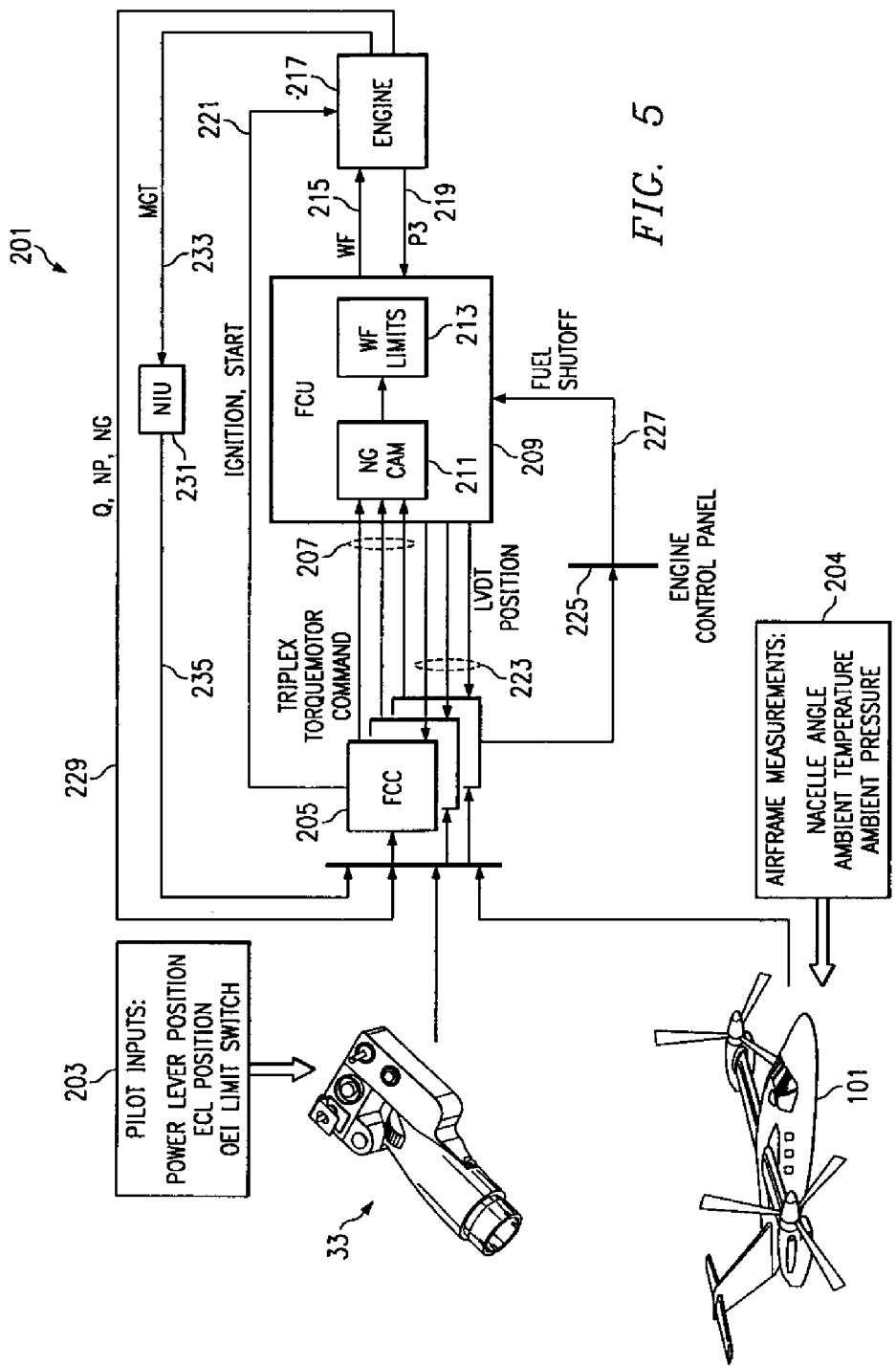
FIG. 5 is a schematic of the interface between an aircraft engine and flight control computers for the power lever tactile cueing system of the present invention.
Figure 6:
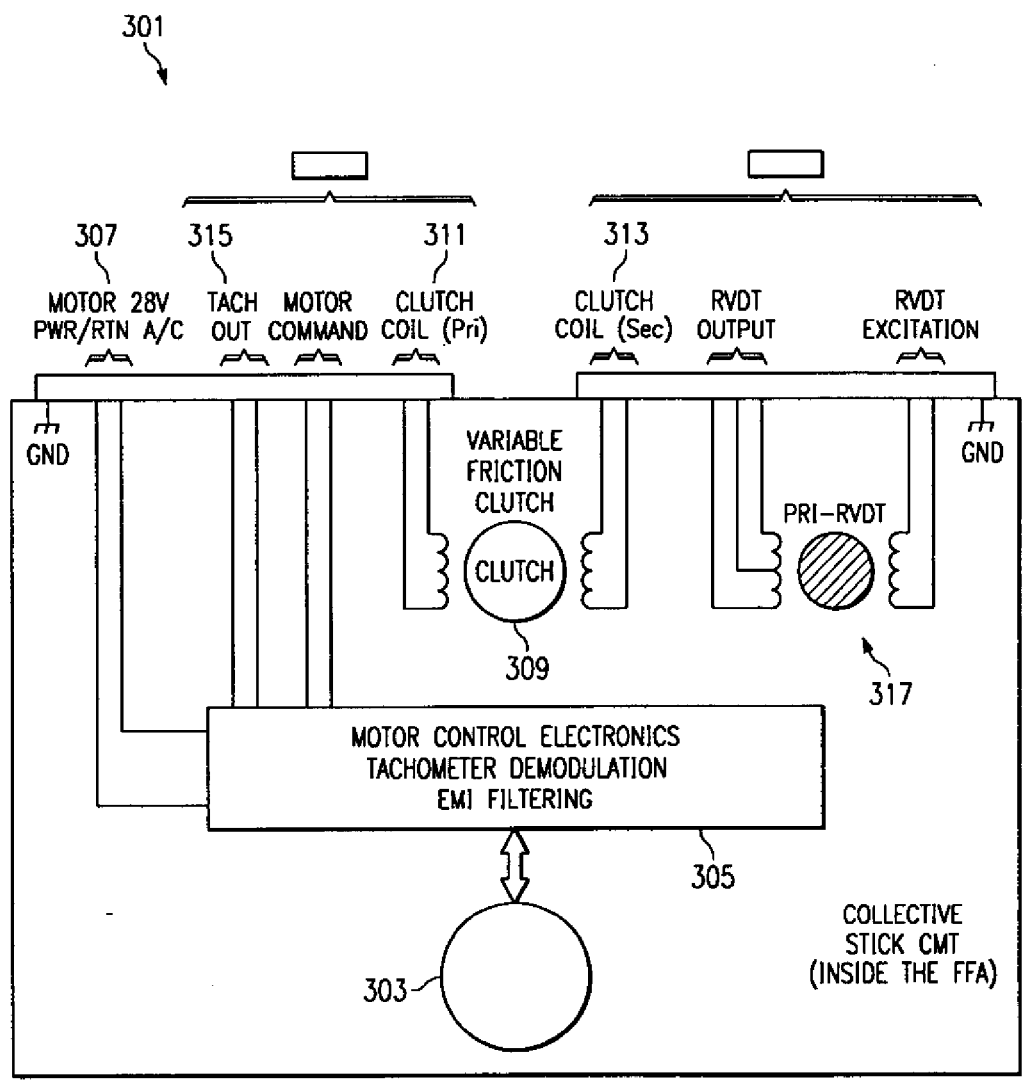
Figure 7A:
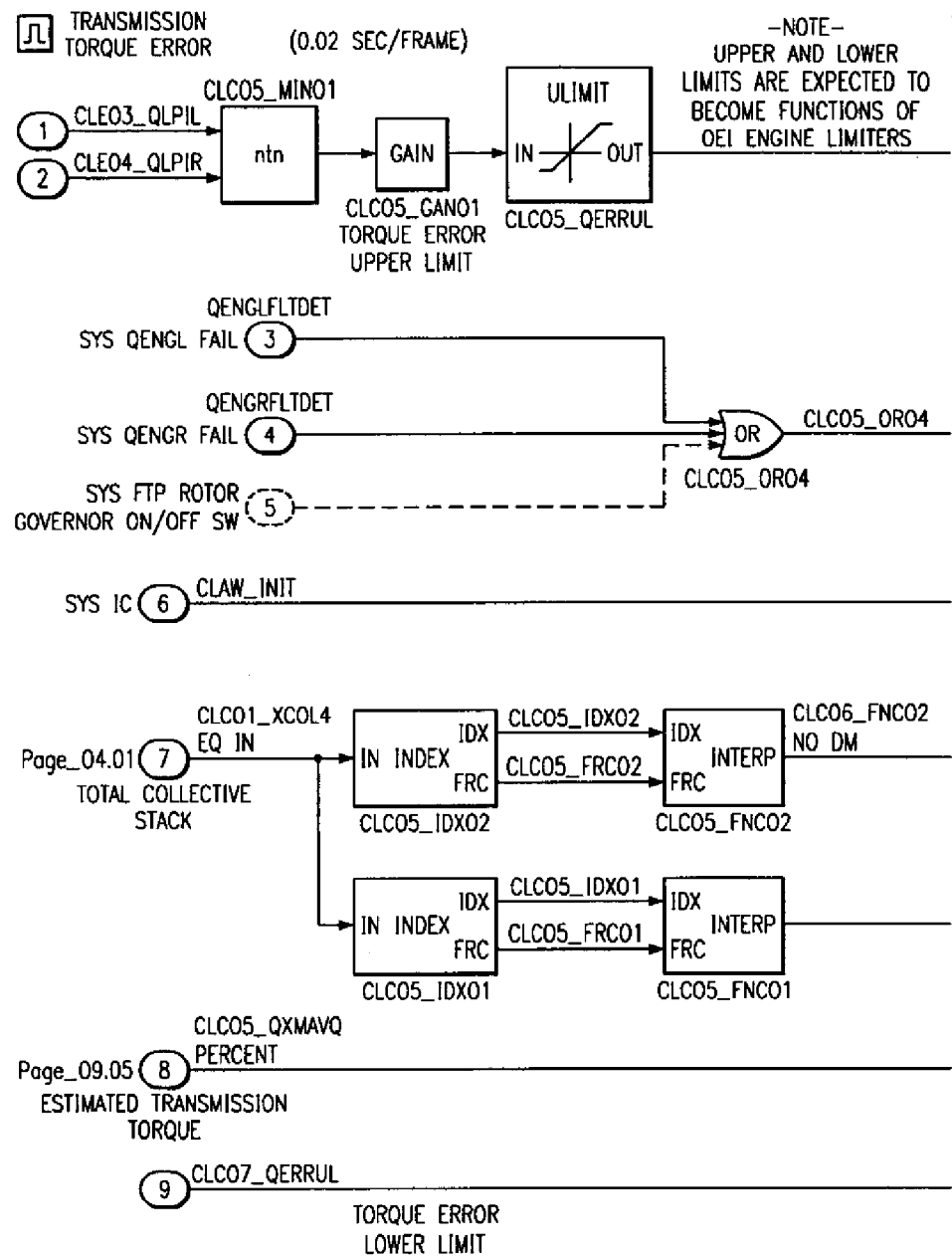
Figure 7C:
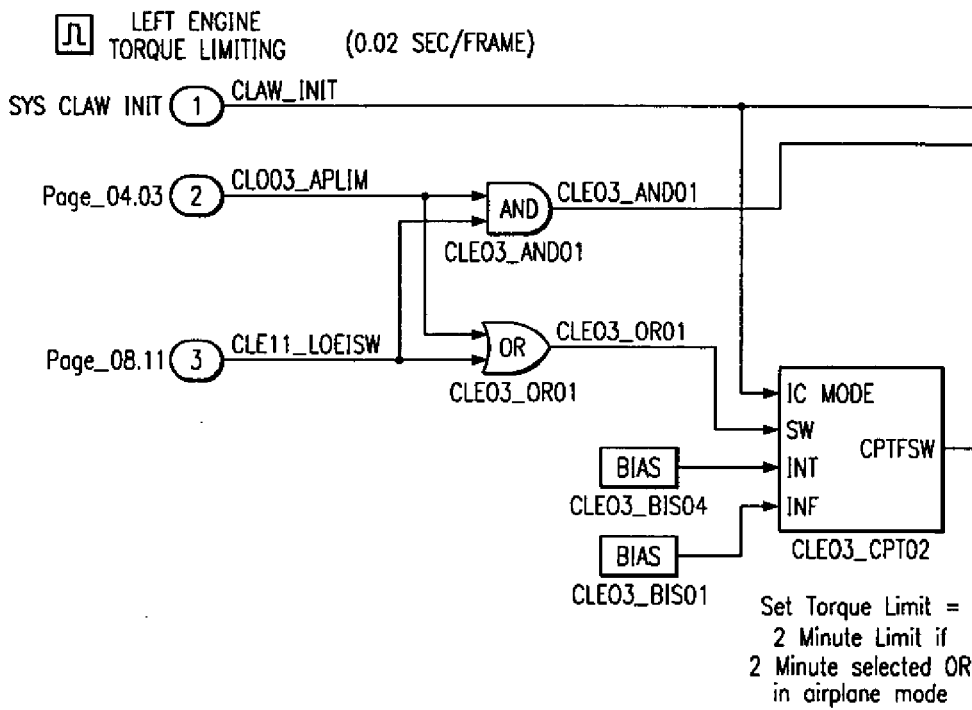
Figure 7D:
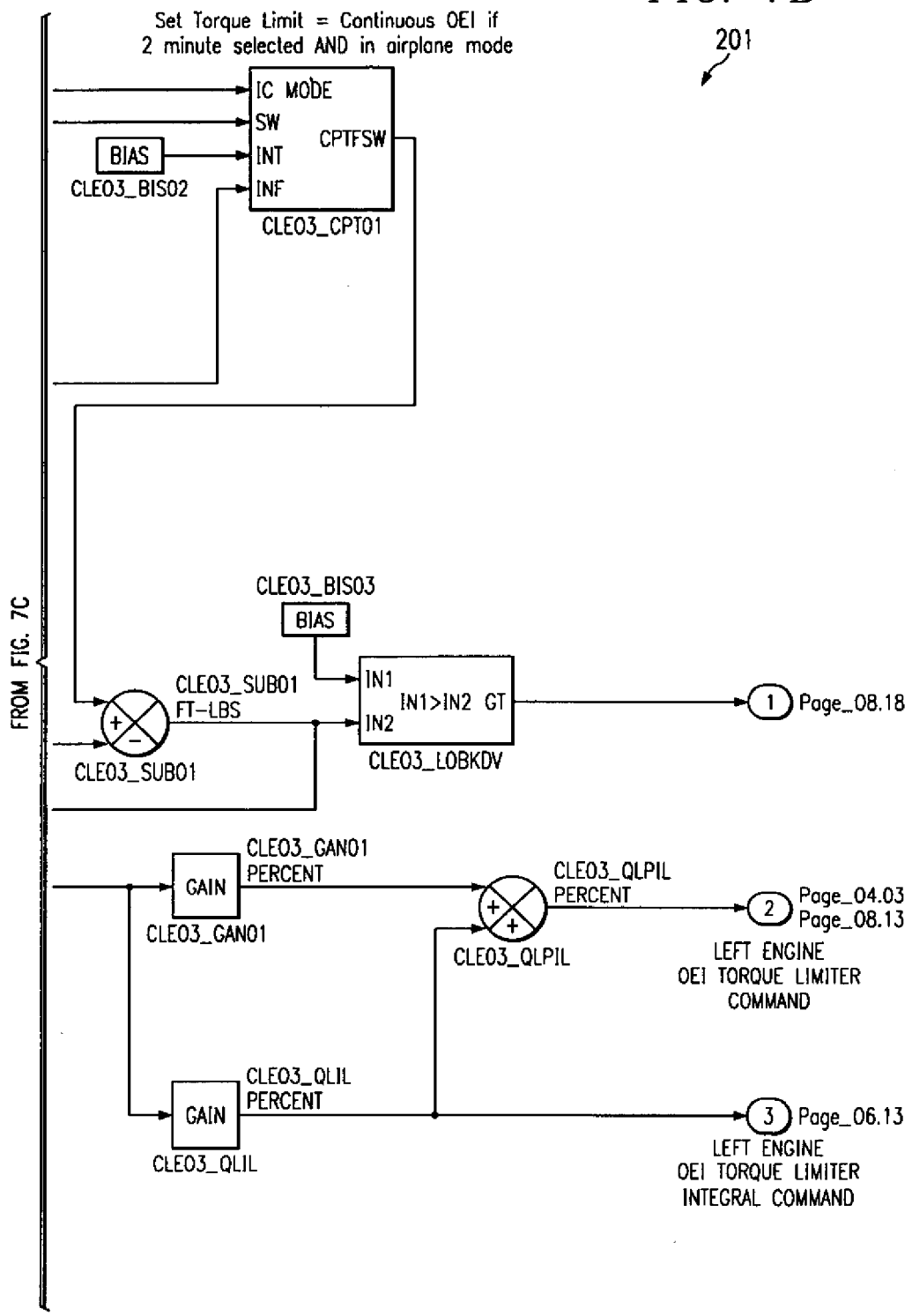
Figure 7E:
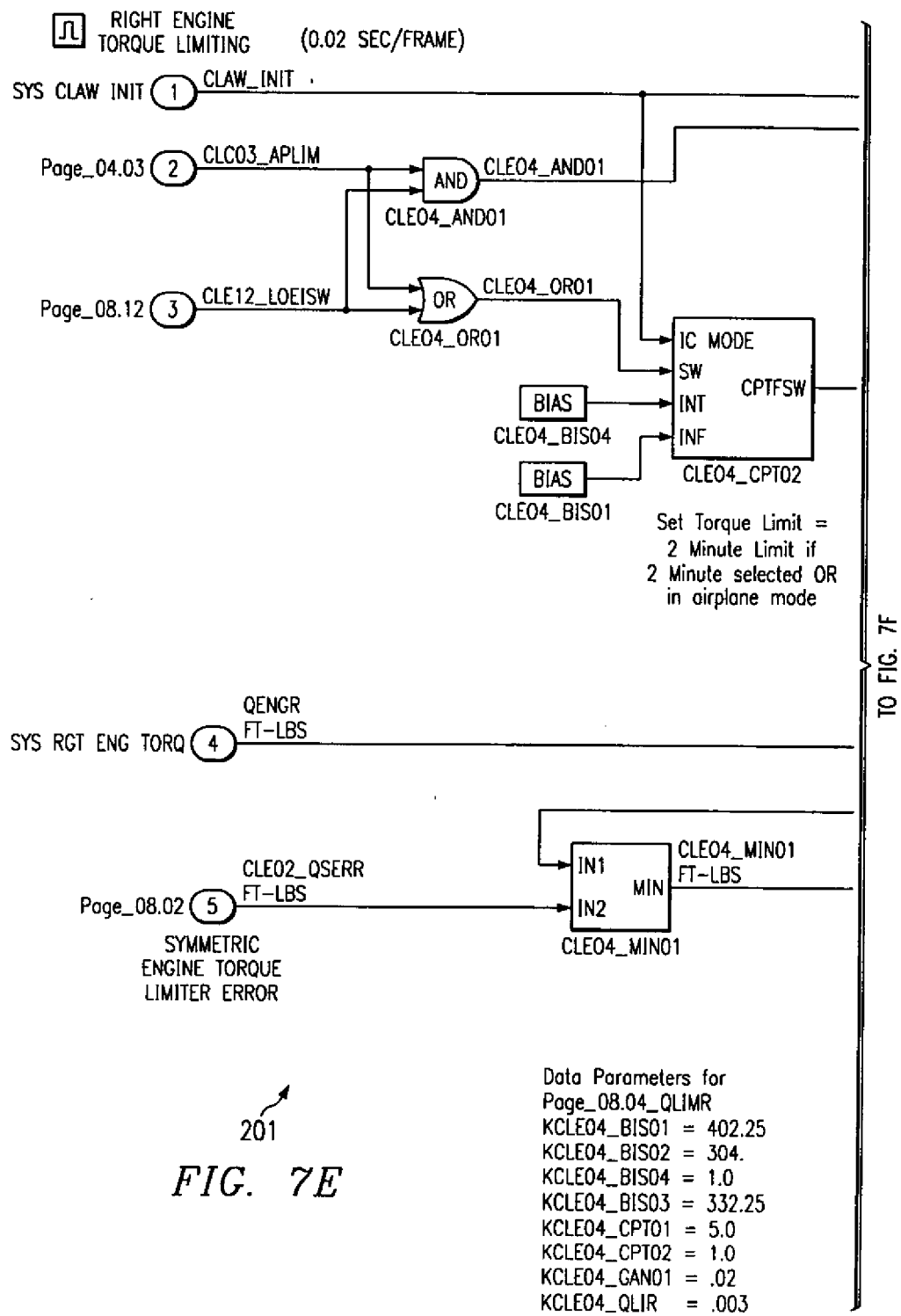
Figure 7F:
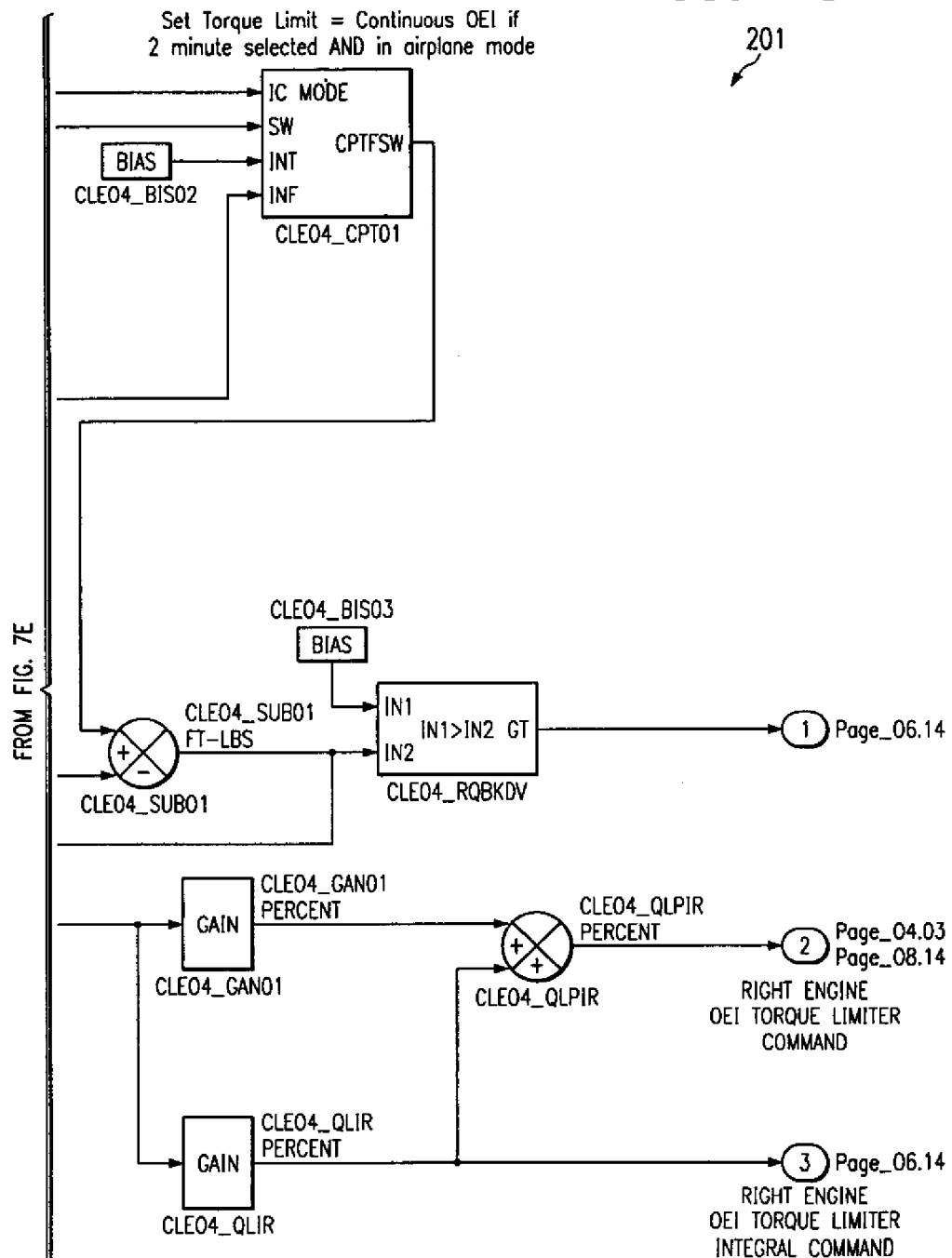
Figure 7G:
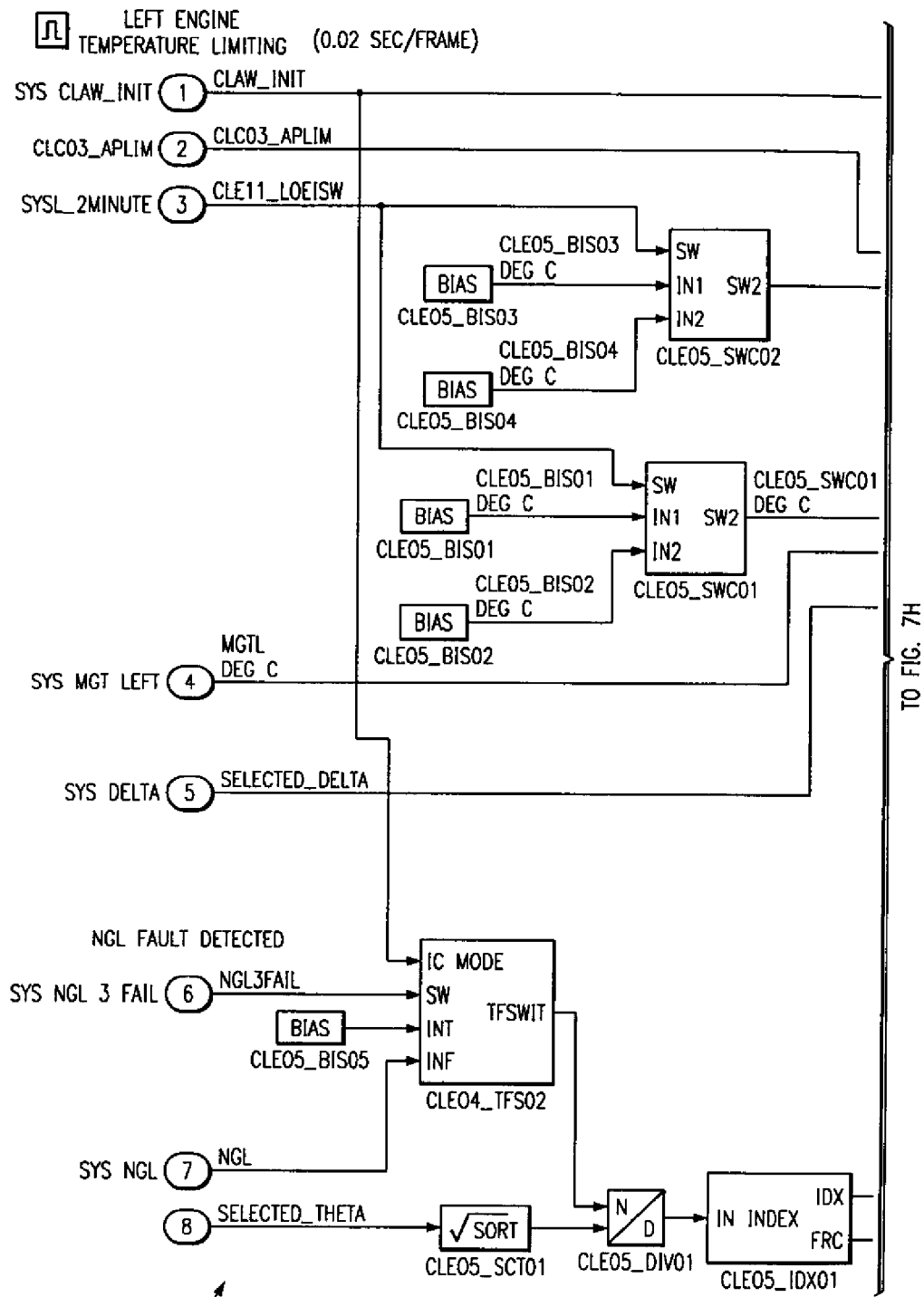
Figure 7H:
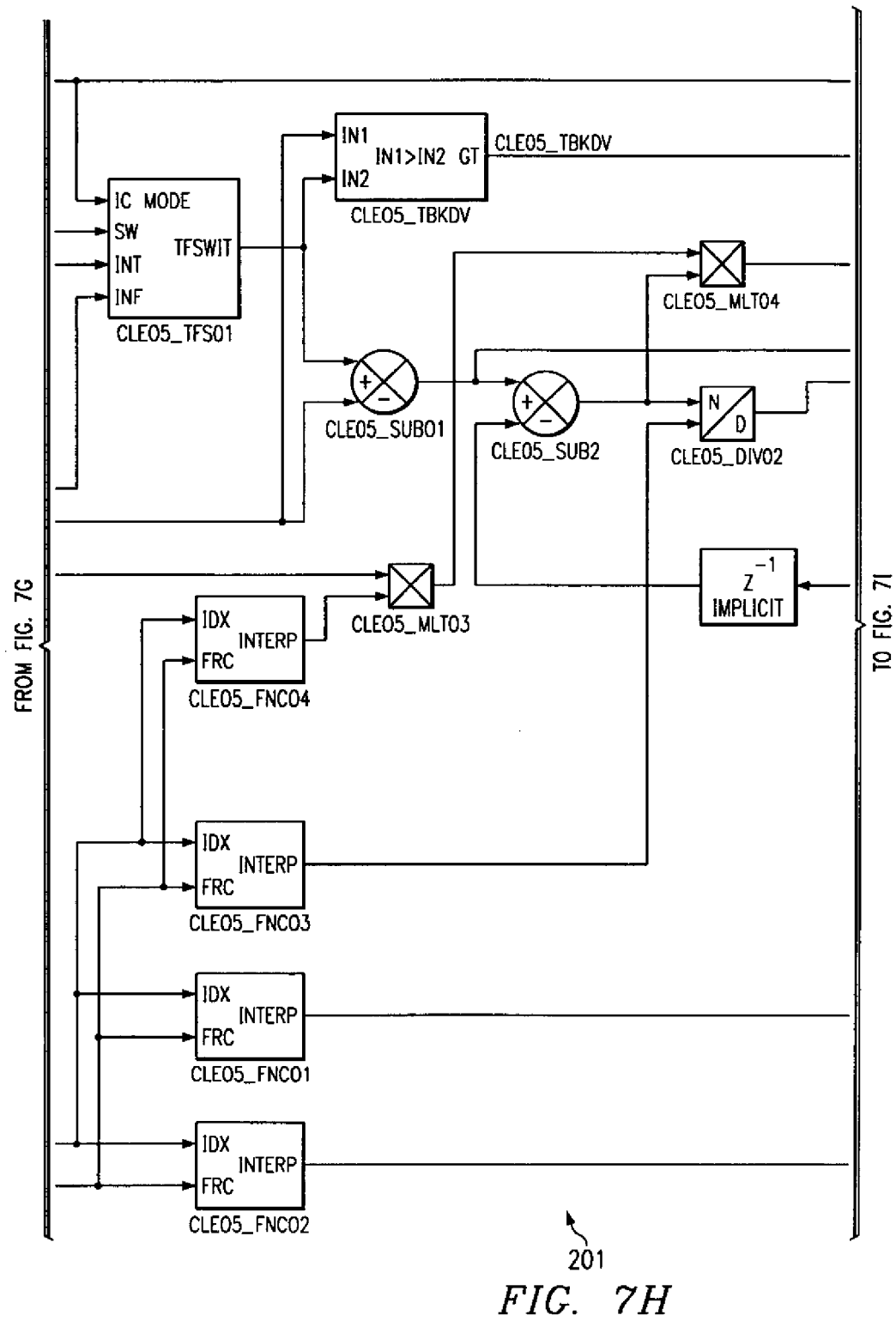
Figure 7I:
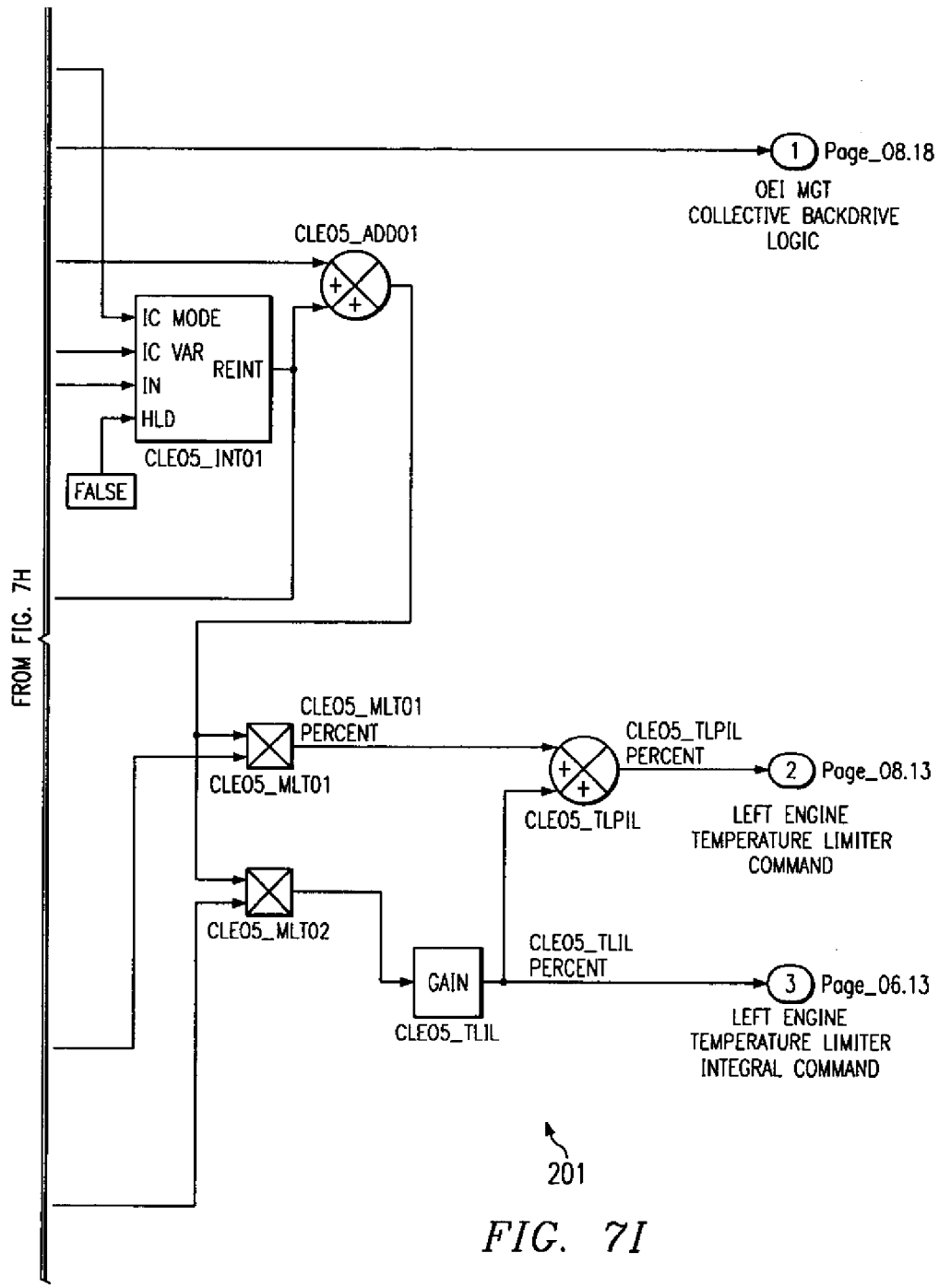
Figure 7K:
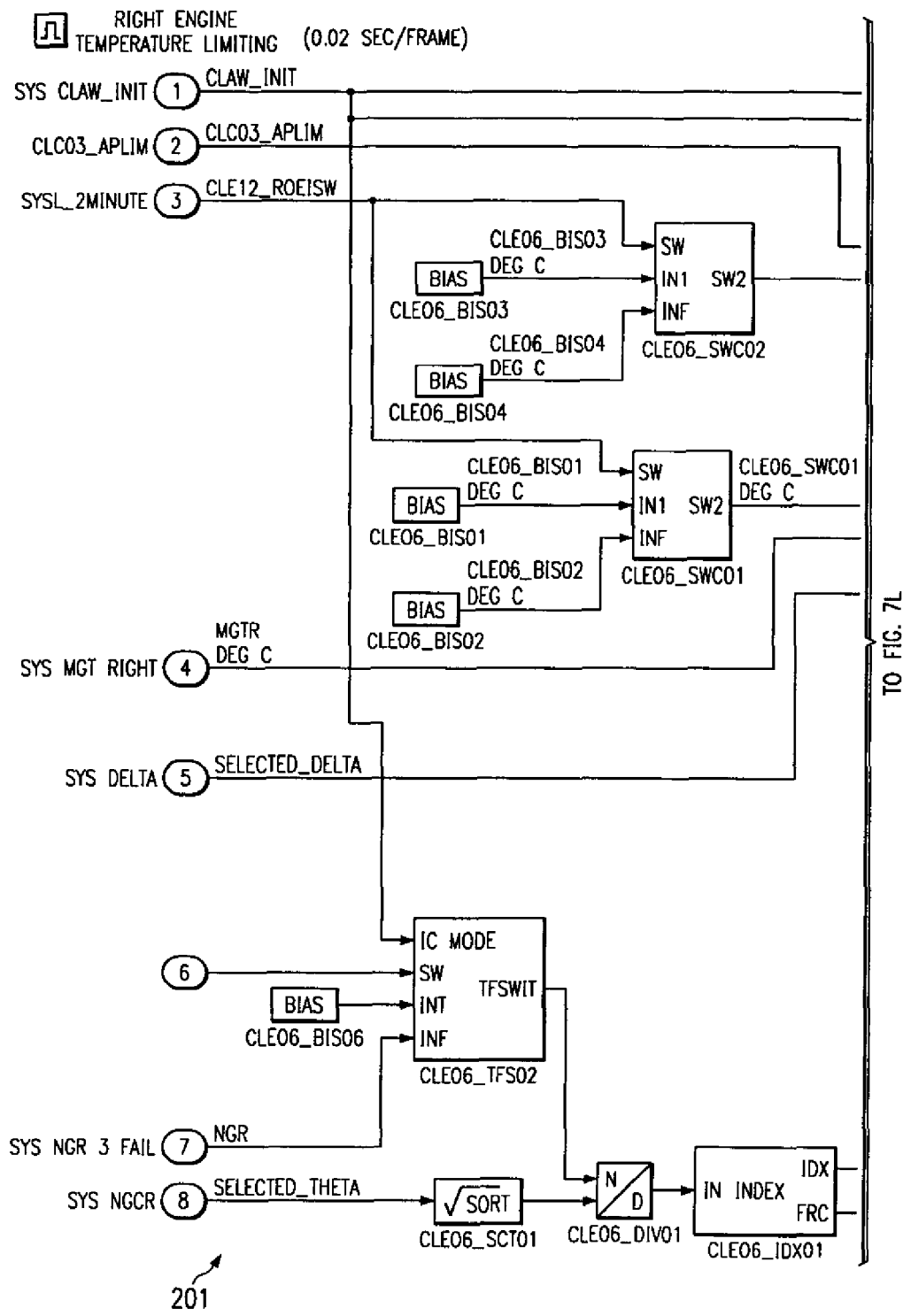
Figure 7L:
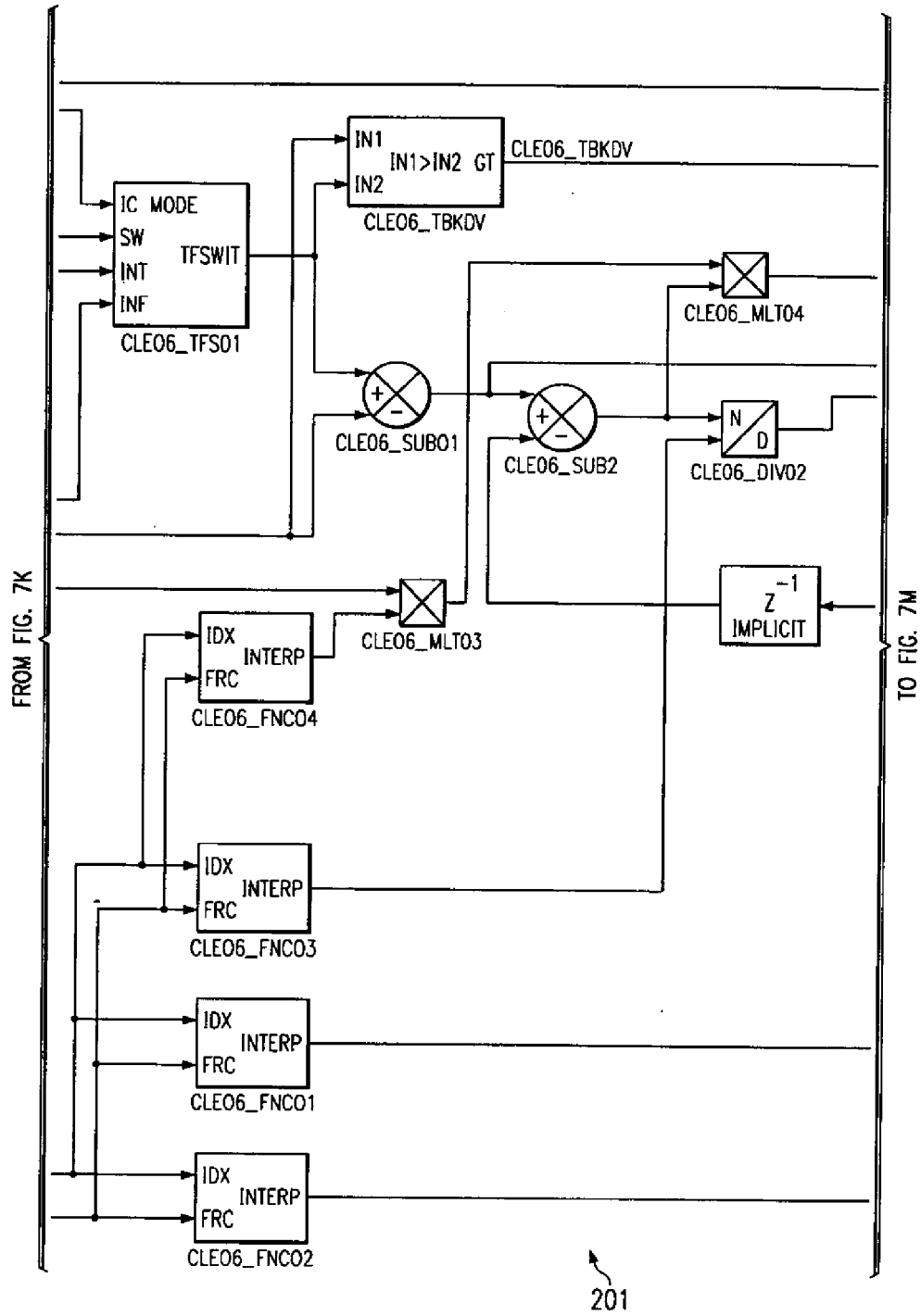
Figure 7M:
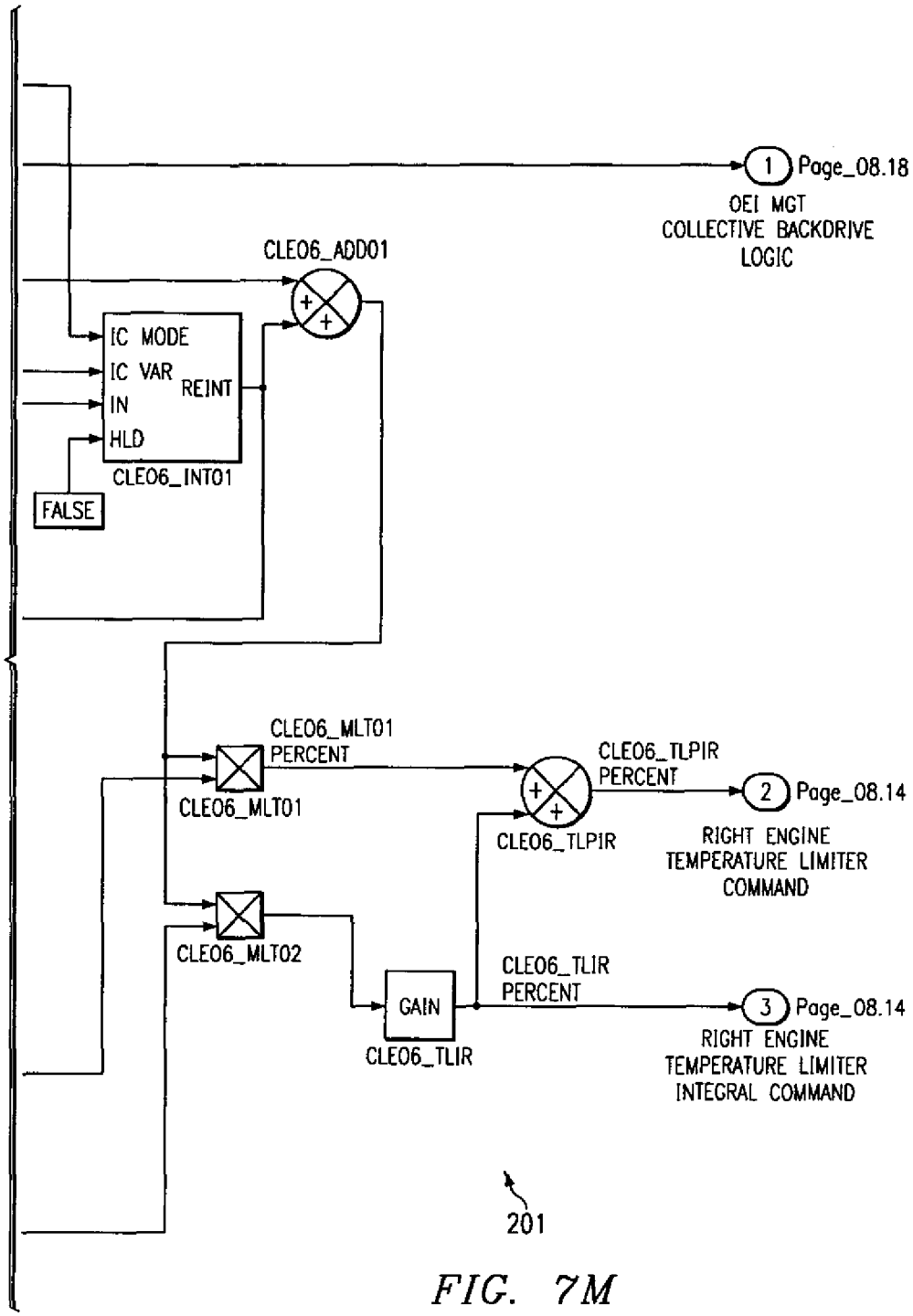
Figure 7O:
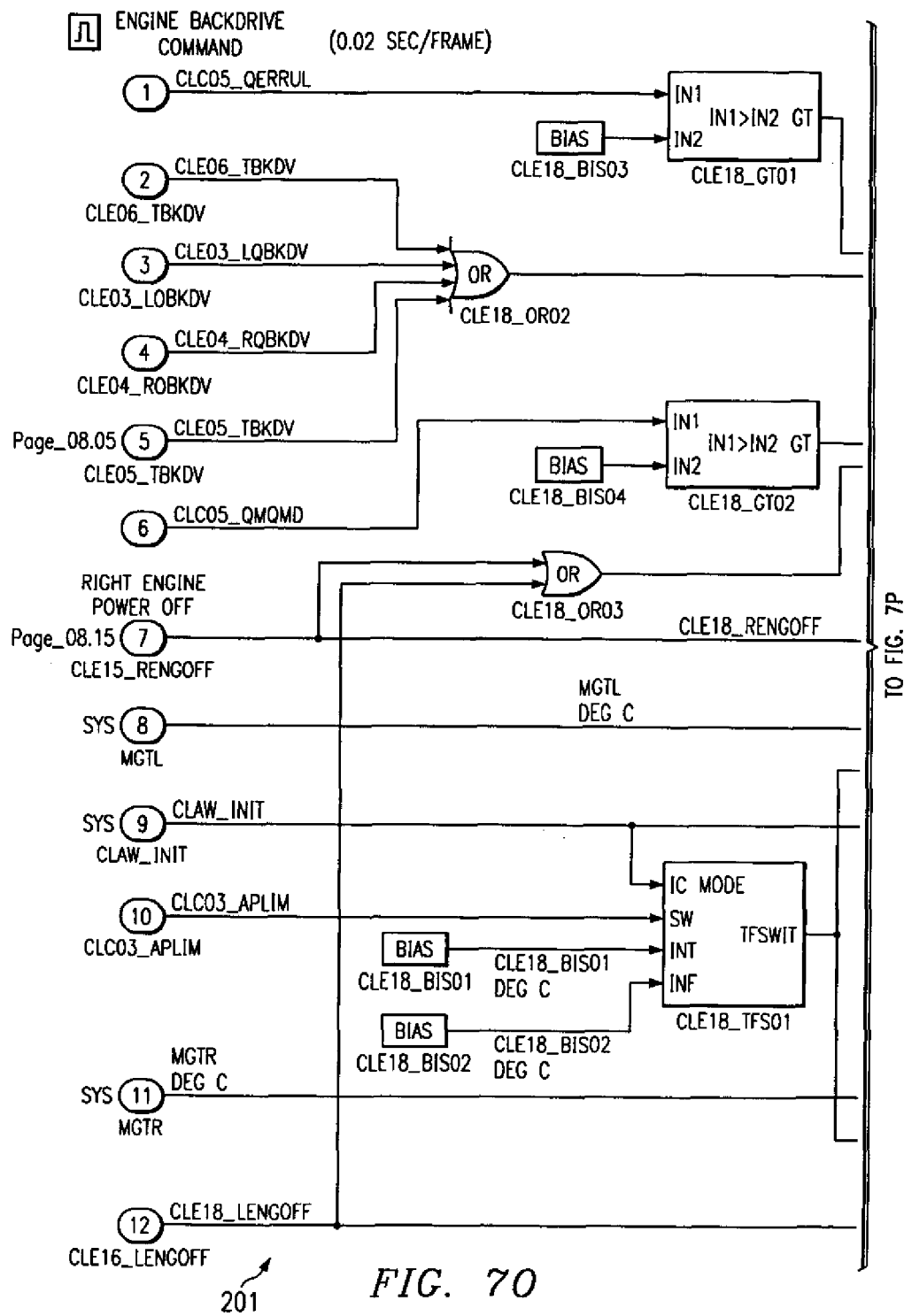
Figure 7P:
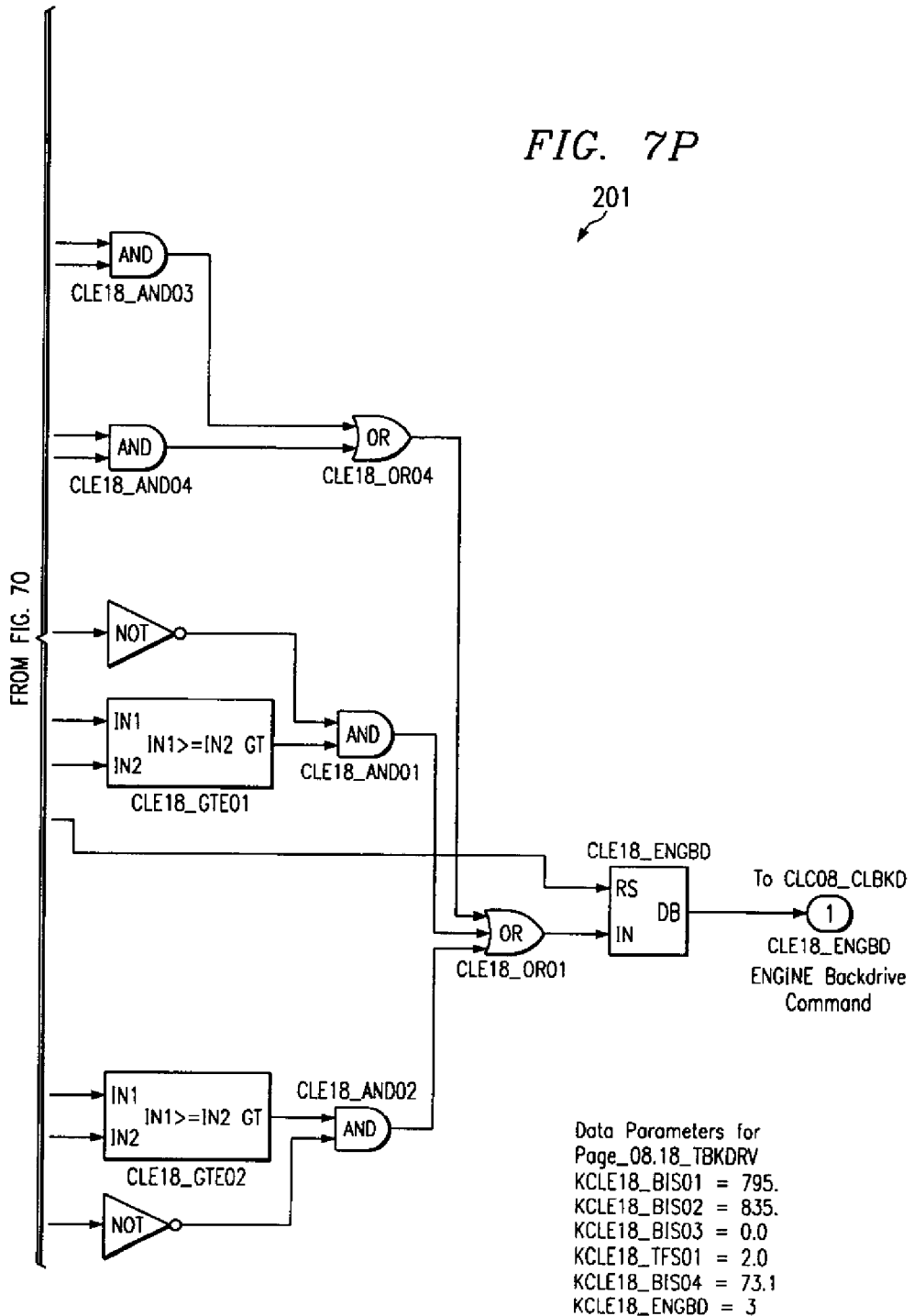
Figure 7Q:
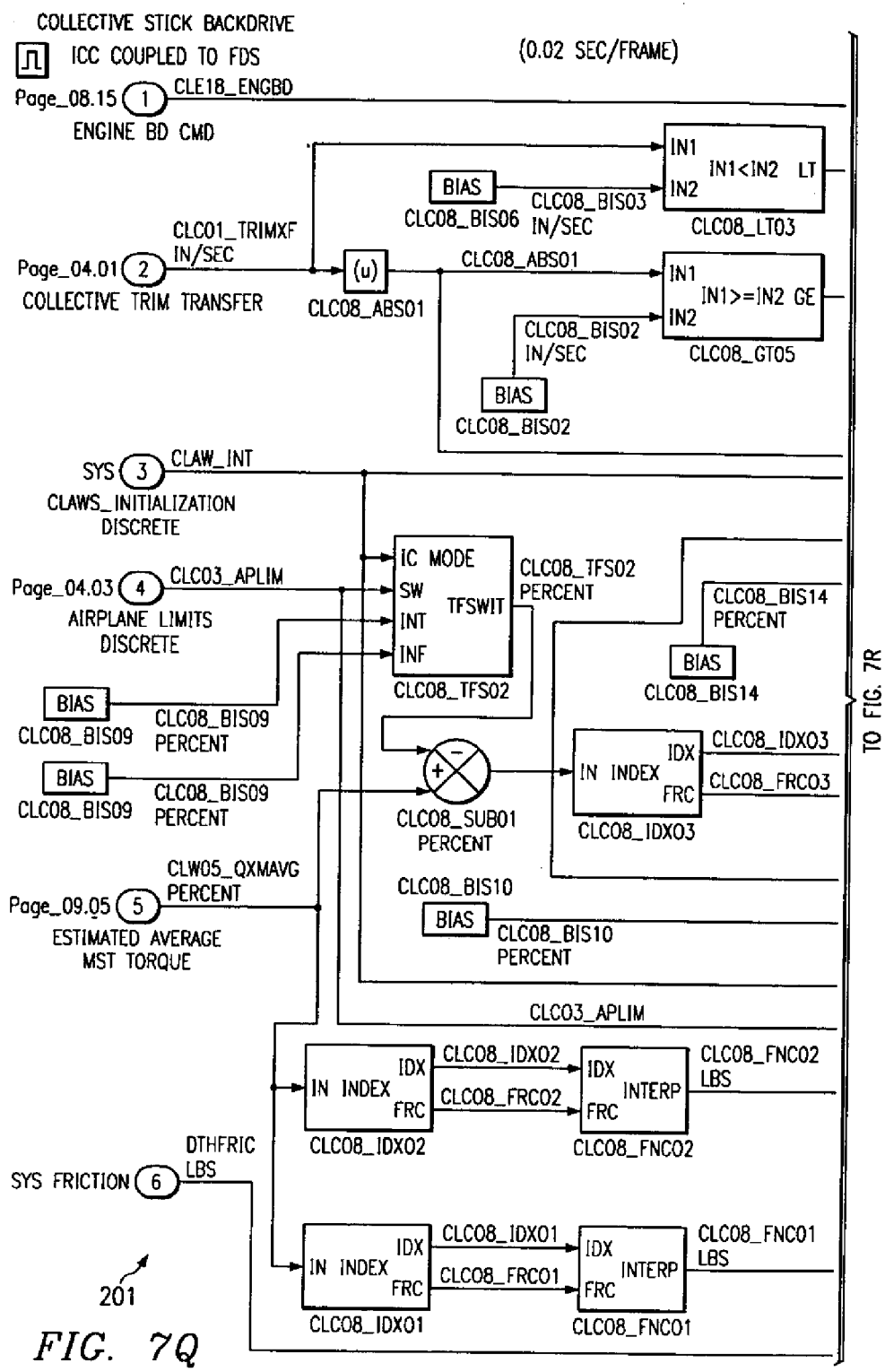
Figure 7R:
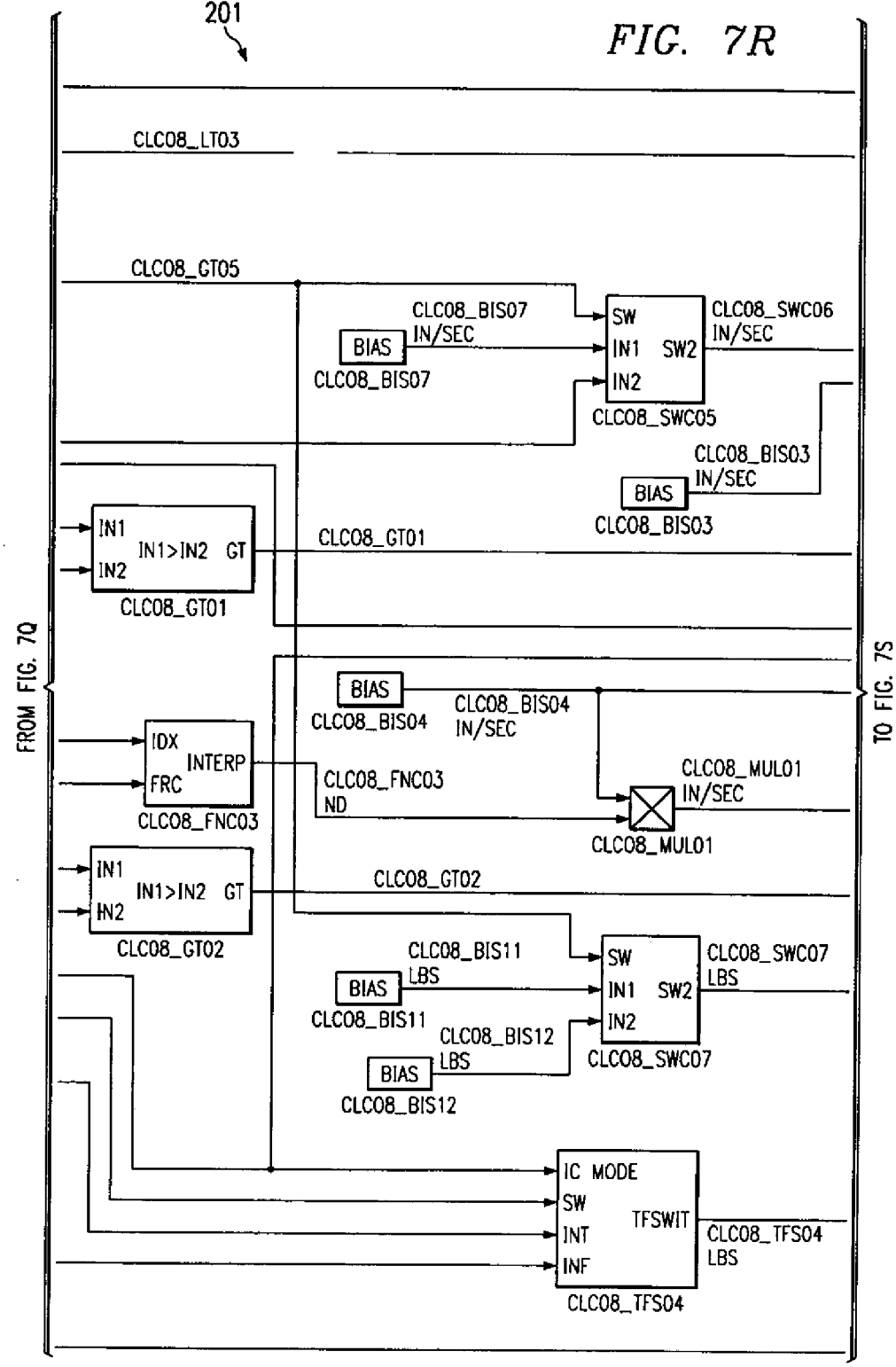
Figure 7S:
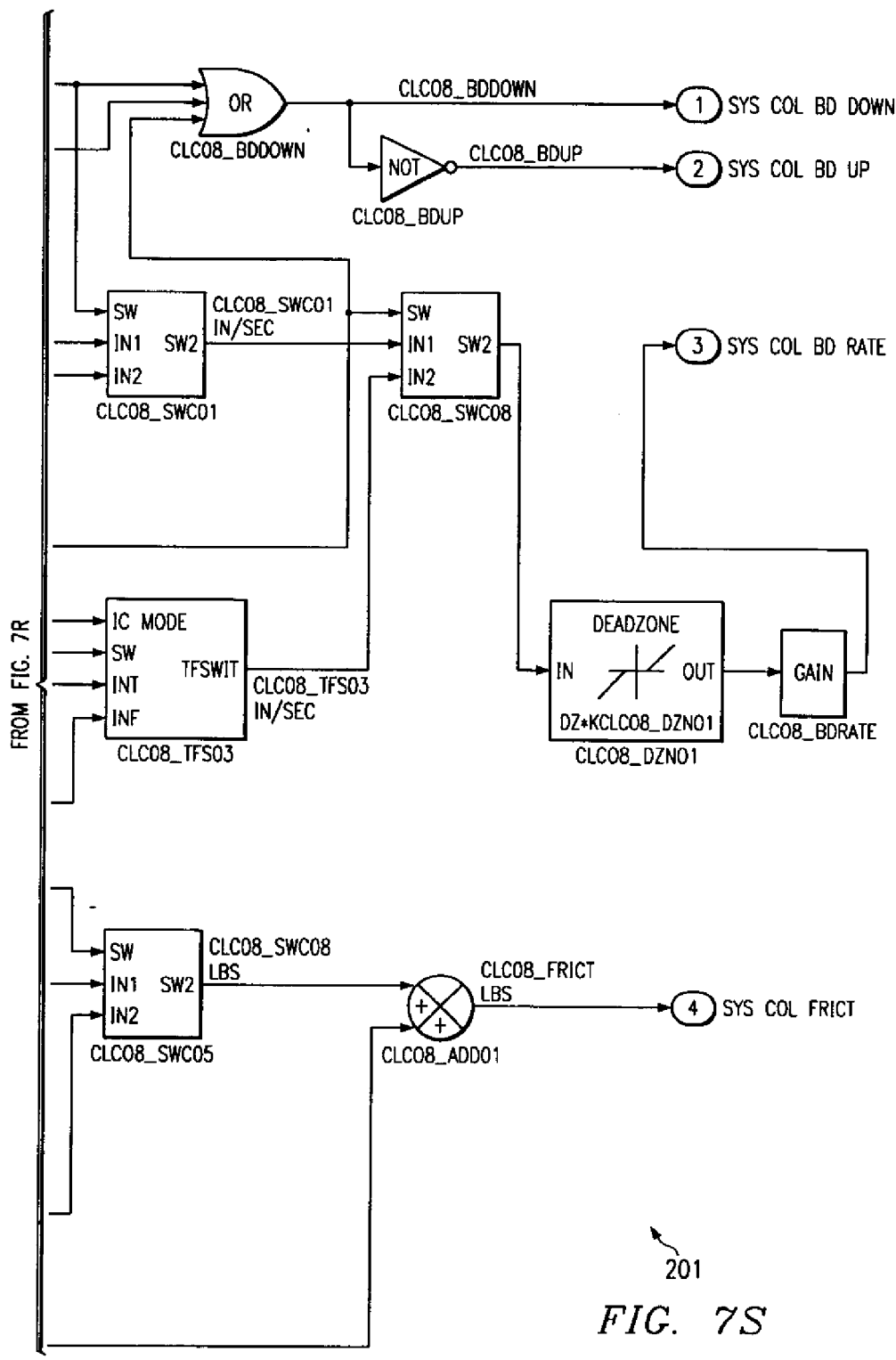

Referring now to FIG. 5 in the drawings, a schematic of the engine and FCC interface 201 is illustrated. Interface 201 is shown in more detail in FIGS. 7A–7G. Power lever 33 includes a plurality of switches and controls 203 for pilot inputs, including: power lever position; an engine condition lever which is used primarily when starting aircraft 11; and a one engine inoperable switch, which is activated by the pilot to switch between a thirty second operating limit for the remaining operable engine to a two minute operating limit. These pilot inputs are fed to a plurality of FCC's 205. In addition, a plurality of airframe measurements 204, including nacelle angle, ambient temperature, and ambient pressure, are fed to FCC's 205.

Triplex torque motor commands 207 are sent from FCC's 205 to a fuel control unit 209. Fuel control unit 209 includes an acceleration cam 211 that generates fuel flow limits 213. Fuel control unit 209 sends fuel flow commands 215 to engines 217, and receives compressor discharge pressure data 219 from engines 217. Some ignition and start commands 221 are passed directly from FCC's 205 to engines 217 bypassing fuel control unit 209. A plurality of a linear voltage differential transducers 223 provide position feedback to FCC's 205. FCC's 205 are electrically coupled to an engine control panel 225 which includes a fuel shut off path 227 for fuel control unit 209.

Engine 217 includes a plurality of sensors, such as engine sensors 35 (see FIG. 2A), which send feedback commands 229 to FCC's 205. Such input commands include signals corresponding to engine torque, power turbine speed, and the operation of engine gas generator 211. A nacelle interface unit 231 is a computer that receives the value of measured gas temperature 233 from engines 217 and sends a corresponding feedback command 235 to FCC's 205.

In this manner, pilot inputs 203 and airframe measurements 204 can be monitored, manipulated, and compared by FCC's 205 to provide a purely electrical cueing system 13 that does not require mechanical springs to provide tactile cue C to the pilot when movement of power lever 33 approaches the operational limits of aircraft 11.

Figure 6:
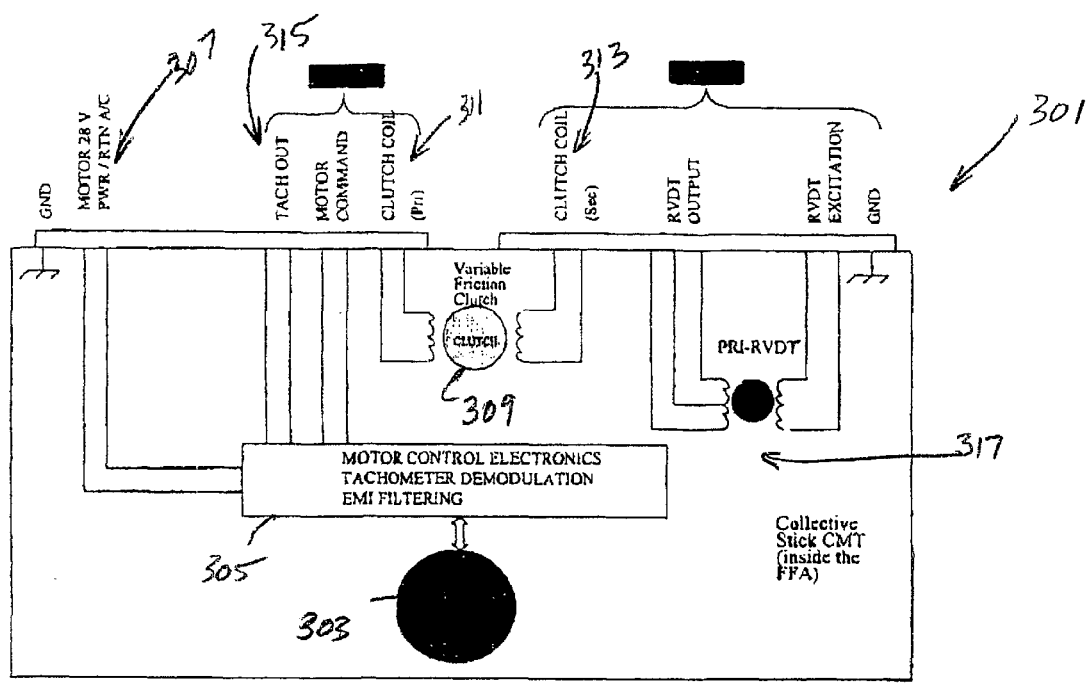
FIG. 6 is an electronic schematic for the power lever tactile cueing system of the present invention.
Figure 7A:
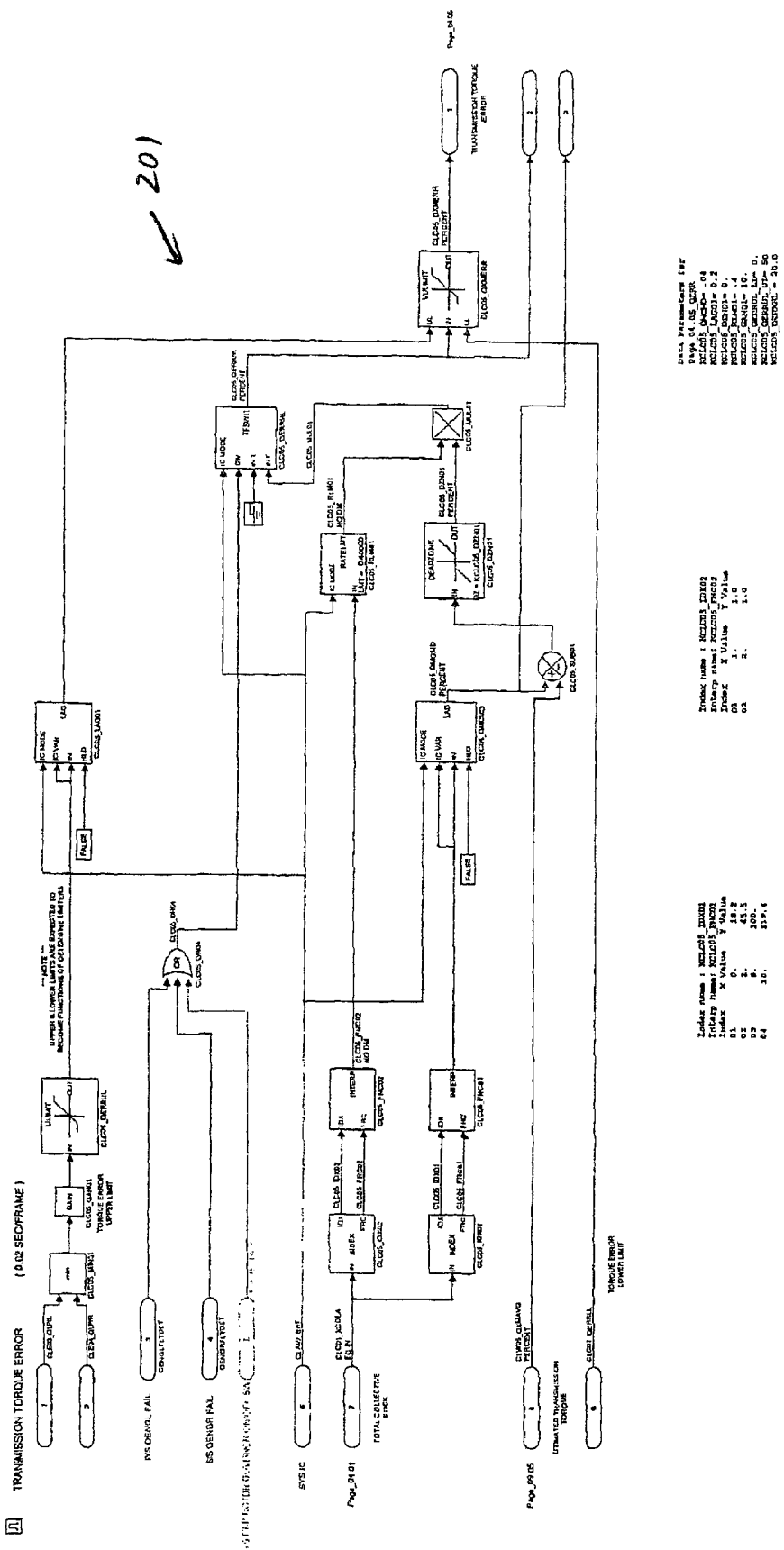
FIGS. 7A–7G are detailed schematics of the interface between an aircraft engine and flight control computers for the power lever tactile cueing system of the present invention.
Figure 7B:
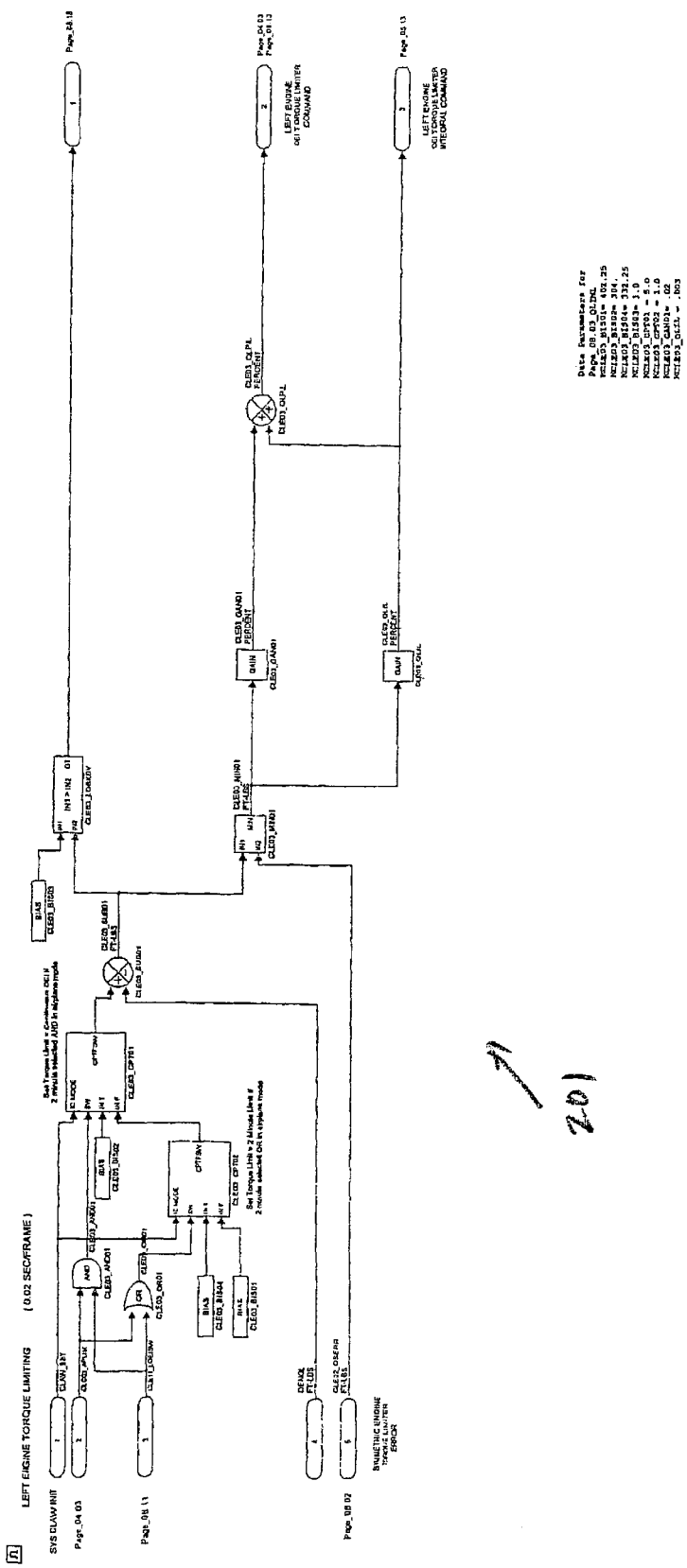
Figure 7C:
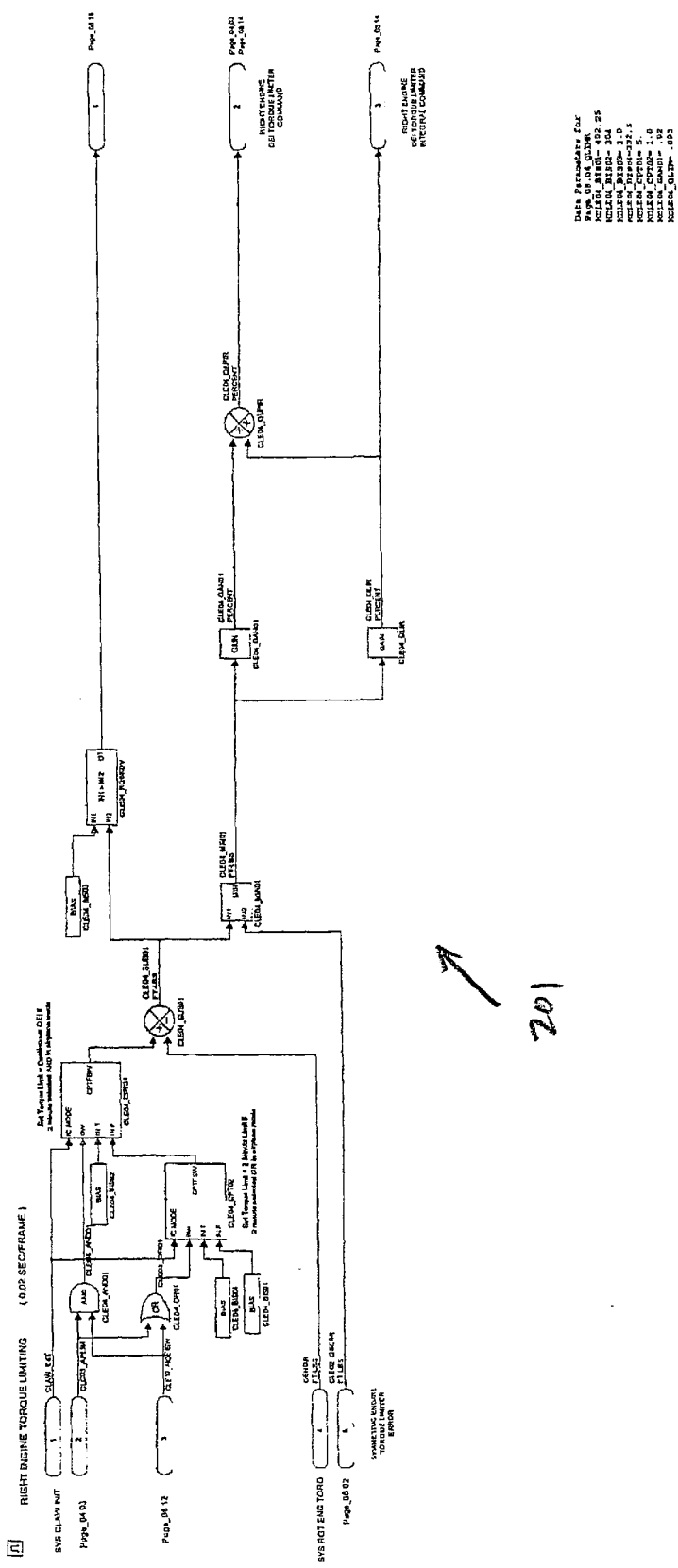
Figure 7D:
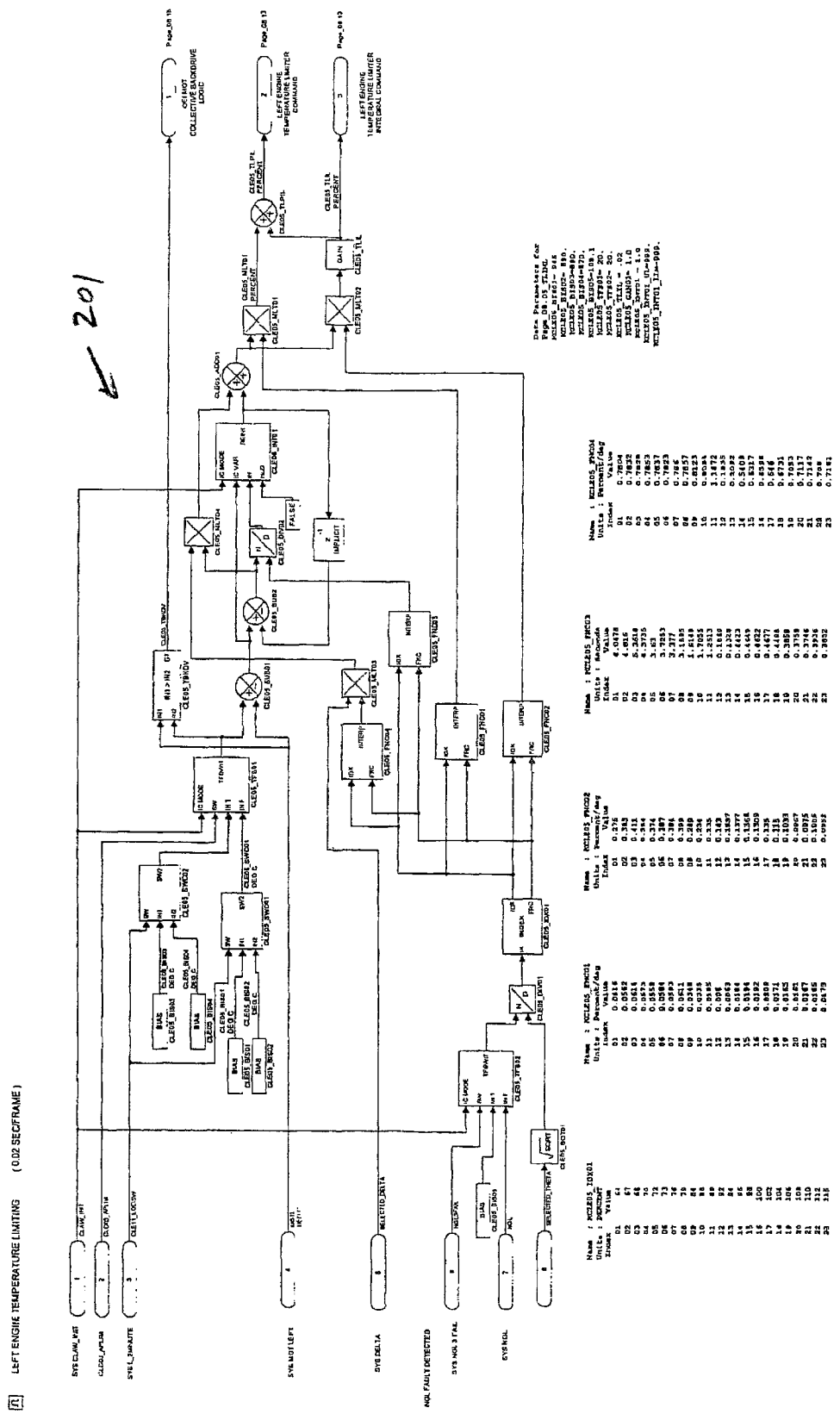
Figure 7E:
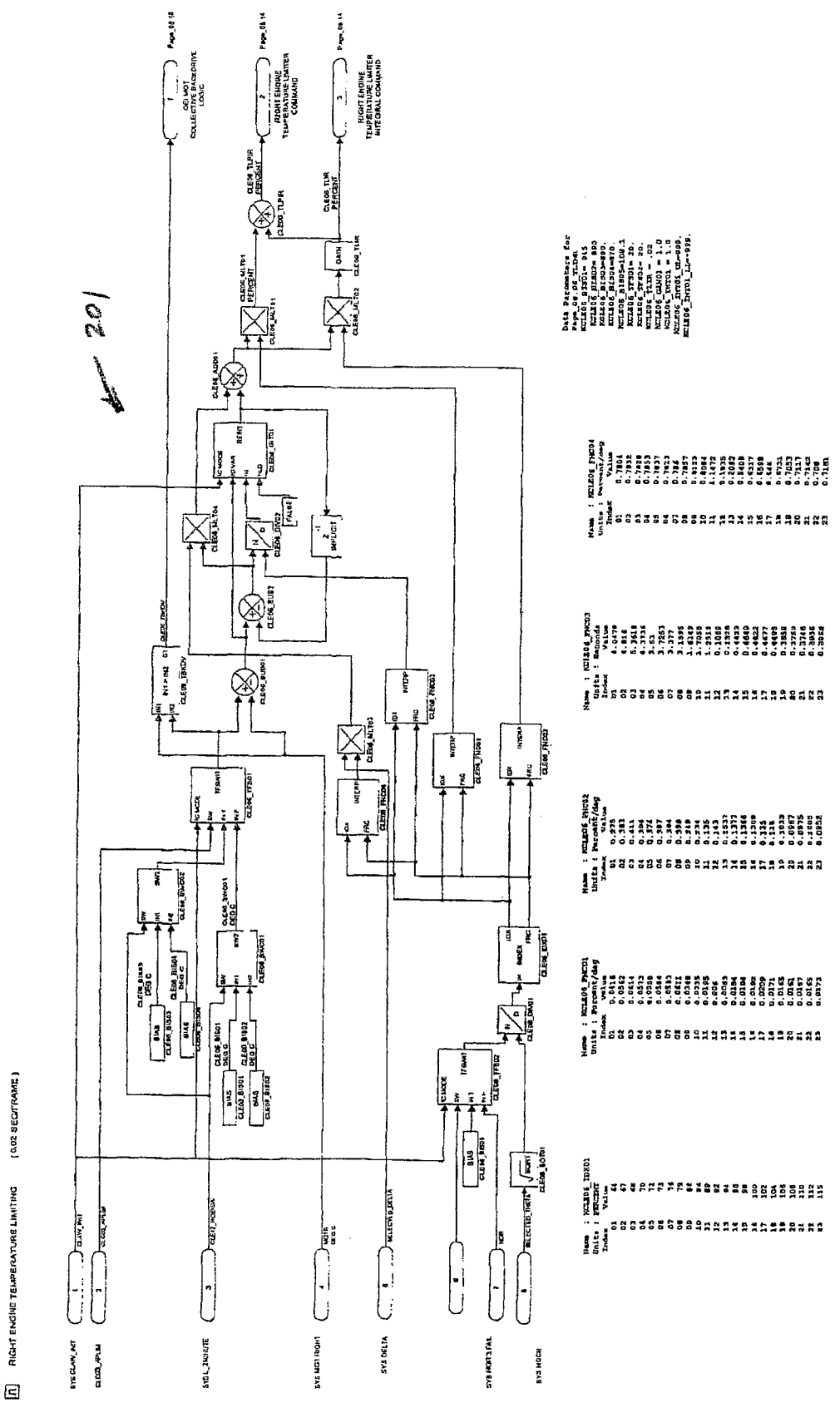
Figure 7F:
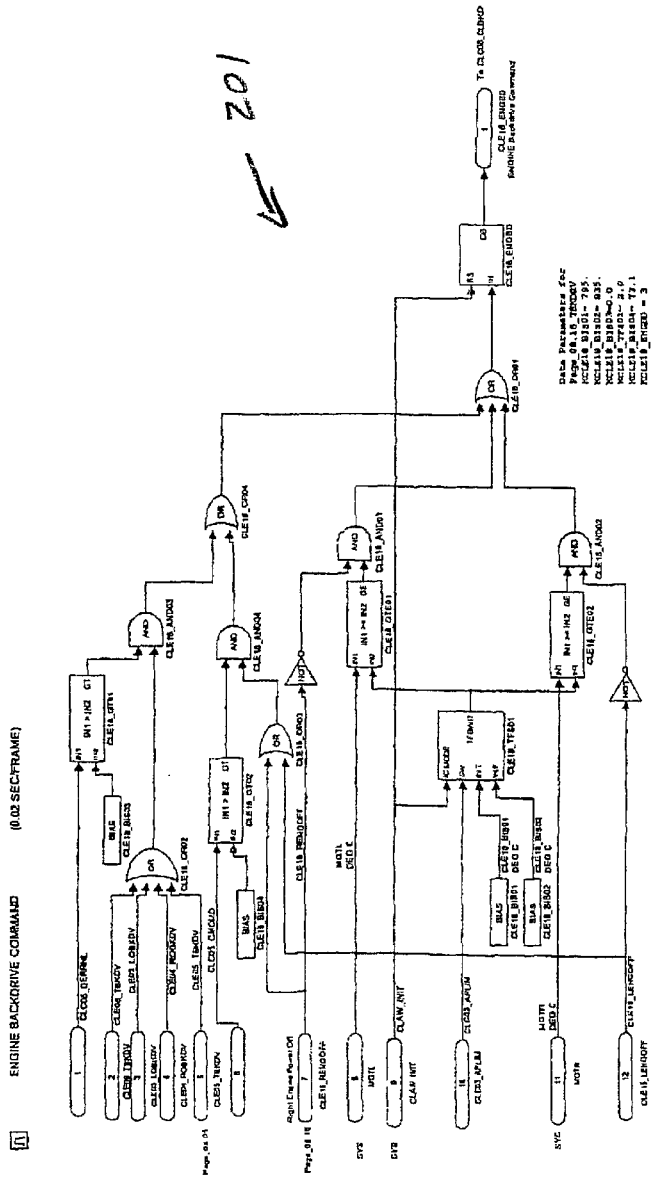
Figure 7G:
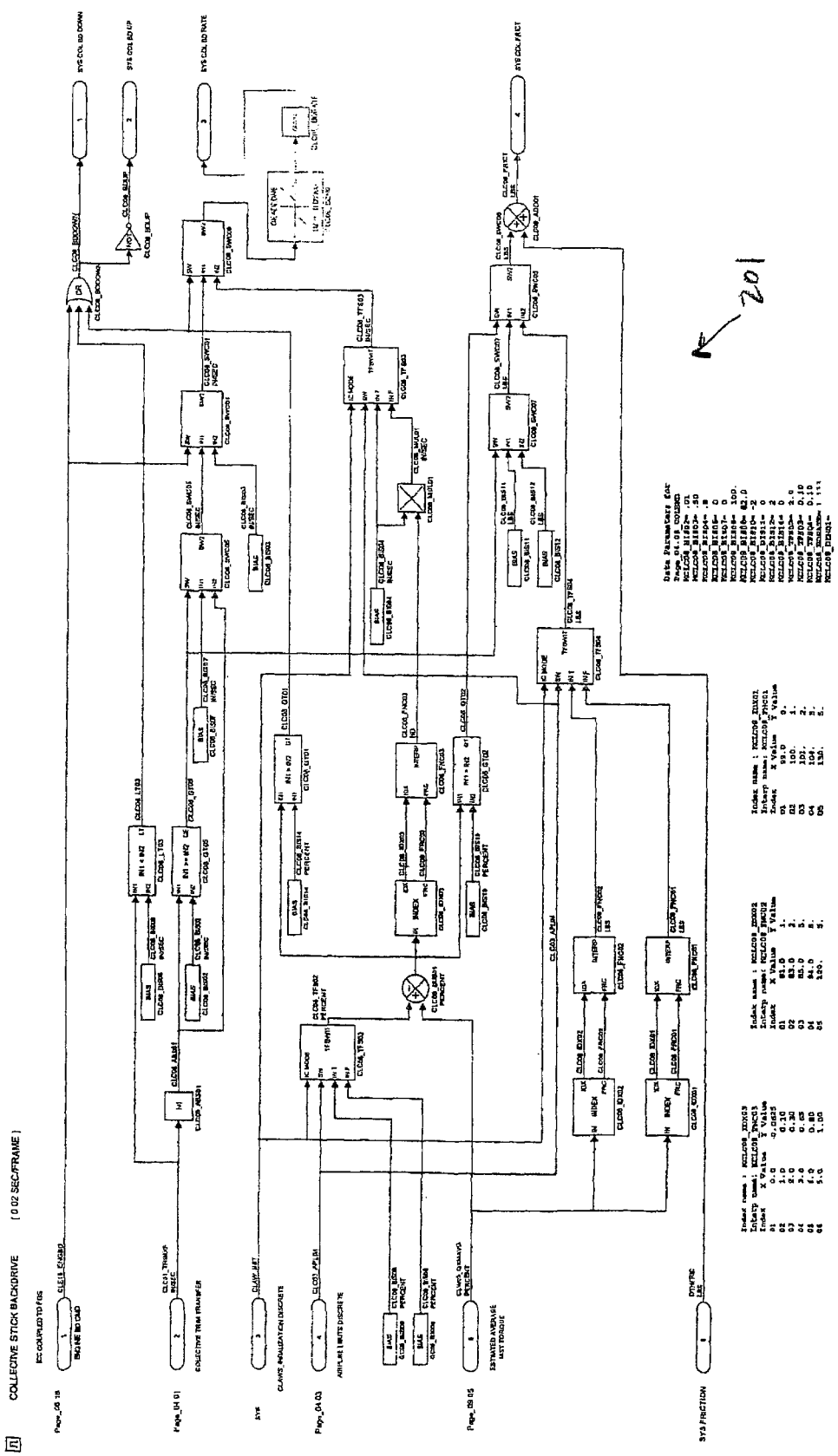
Figure 1:
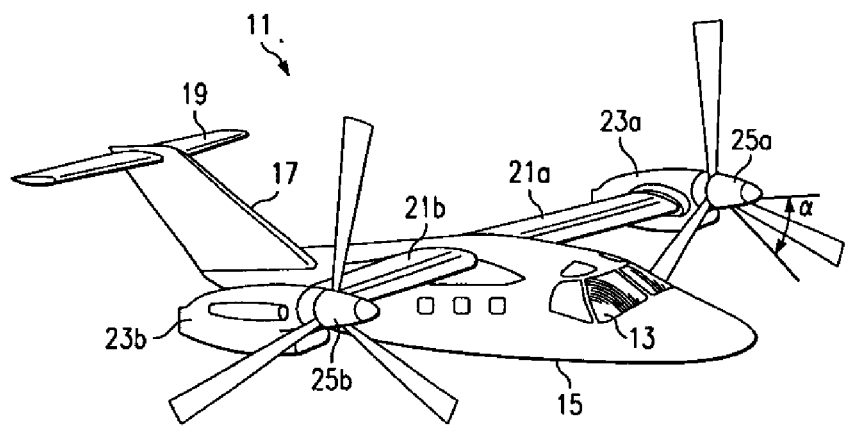

Referring now to FIG. 6 in the drawings, a schematic of the electronics 301 of cueing system 13 is illustrated. An electric trim motor 303 provides the force and actuation of power lever 33. Motor 303 is controlled by a controller 305 that includes motor control electronics, tachometer demodulation electronics, and electromagnetic interference filtering electronics. Motor 303 is preferably powered by a 28 Volt AC power supply 307. Controller 305 also controls a variable friction magnetic particle clutch 309 having a primary clutch coil 311 and a secondary clutch coil 313. In the preferred embodiment, motor 303 is coupled to clutch 309, and clutch 309 is coupled to power lever 33. A rotary variable differential transducer 317 serves as a position sensor to detect and transmit the position of power lever 33 to controller 305. If rotary variable differential transducer 317 detects that the position of power lever 33 is approaching a position that represents the operational limits of tiltrotor aircraft 11, a signal is sent to motor 303 and an appropriate tactile cue C is generated on power lever 33. Cueing system 13 accomplishes this without the need or use of mechanical springs.

Clutch 309 is a "slipping" clutch which allows cueing system 13 to provide a variable tactile cue on power lever 33. The closer power lever 33 gets to a position which would cause tiltrotor aircraft 11 to operate at unsafe conditions, the greater the force of tactile cue C that clutch 309 allows to be transmitted to power lever 33. In other words, clutch 309 slips less and creates more force that the pilot must overcome when power lever 33 approaches the operational limits of tiltrotor aircraft 11.

Electronics 301 are electrically coupled to FCC's 205. FCC's 205 convert drive rate commands in inches per second into revolutions per minute to control a tachometer servo loop 315 that controls the speed of motor 303. FCC's 205 convert force commands in pounds into an electric current in amperes that varies the friction force of magnetic particle clutch 309.

Tactile cue C is provided by variable friction magnetic particle clutch 309 and trim motor 303 which increase the friction of power lever 33 when a critical engine parameter limit is reached. This increase in friction is achieved by increasing the current in variable friction magnetic particle clutch 309. In this manner, power lever 33 is trimmed down, or "backdriven," to the predetermined limit setting. This increase in friction is perceived by the pilot as a spring breakout and gradient, as shown in block 55 of FIG. 2A. The pilot can command variable friction magnetic particle clutch 309 to slip by applying a force to power lever 33 of greater than about 8 pounds.

The present invention provides the following advantages: (1) reduces pilot workload by allowing the pilot to determine operating limits without continually monitoring multiple engine and drive system gauges in the cockpit; (2) improves flight safety by reducing the likelihood of exceeding engine and drive system operating limits; (3) improves operational costs by reducing the likelihood of engine and drive system overhauls resulting from inadvertent exceedances of operational limits; (4) improves flight safety by allowing the pilot to override normal operational limits, but not allowing the pilot to override structural design static limits; (5) improves aircraft performance during maximum gross weight vertical takeoffs by allowing the pilot to set power to 100% of the operating limit without continually monitoring multiple engine and drive system gauges; (6) reduces pilot workload following an engine failure by automatically eliminating control deadzone when operating on an engine limit; (7) provides a low-weight implementation of the tactile cue by using the same equipment required for autopilot operation; (8) provides an immediate tactile cue to the pilot that the aircraft has become power-limited as a result of a propulsion system malfunction; and (9) eliminates the requirement for the pilot to manually modulate the power lever when power limits change as a function of flight condition.

Although the present invention is shown in a limited number of forms, it is not limited to just these forms, but is amenable to various changes and modifications without departing from the spirit thereof.

What is claimed is:

1. A tiltrotor aircraft comprising:

a fuselage;

at least one wing member coupled to the fuselage;

a tiltrotor assembly pivotally coupled to the at least one wing member;

at least one flight control computer;

a power lever for controlling the operations of the tiltrotor aircraft, the power lever being electrically coupled to the at least one flight control computer; and a springless cueing system electrically coupled to the power lever and to the at least one flight control computer for generating variable and automatic tactile cues to the power lever in response to a tactile cue command generated by the at least one flight control computer;

wherein a plurality of sensed engine and drive system parameters are continuously compared to predetermined operational limits for such engine and drive system, such that the tactile cues are generated on the power lever based upon the engine or drive system parameter that is most critical relative to the respective predetermined operational limit.

2. The tiltrotor aircraft according to claim 1, wherein the springless cueing system comprises:

control electronics electrically coupled to the at least one flight control computer;

an electric motor electrically coupled to the control electronics;

a variable friction magnetic particle clutch electrically coupled to the control electronics; and a position sensor coupled to the control electronics for sensing the position of the power lever;

wherein the electric motor and the variable friction magnetic particle clutch generate the tactile cues to the power lever without the use of mechanical springs.

3. The tiltrotor aircraft according to claim 2, wherein the springless cueing system is activated when the position of the power lever approaches a position which represents an operational limit of the tiltrotor aircraft as detected by the position sensor.

4. The tiltrotor aircraft according to claim 1, wherein the tactile cues comprise:

a variable drive rate on the power lever; and a variable friction force on the power lever;

wherein the variable drive rate and the variable friction force resist movement of the power lever.

5. The tiltrotor aircraft according to claim 4, wherein the variable drive rate is between about 0.08 inches per second and about 0.8 inches per second.

6. The tiltrotor aircraft according to claim 4, wherein the variable friction force is between about zero pounds and about 3.0 pounds.

7. The tiltrotor aircraft according to claim 4, further comprising:

a means for producing a pilot adjustable friction force on the power lever;

wherein the variable friction force is added to the pilot adjustable friction force.

8. The tiltrotor aircraft according to claim 4, further comprising:

a plurality of sensors for generating sensor signals corresponding to selected operating conditions of the tiltrotor aircraft;

a plurality of red line limit algorithms for generating red line signals corresponding to selected operating conditions of the tiltrotor aircraft;

a backdrive command algorithm for comparing the sensor signals to the red line signals and for generating an error signal;

wherein the magnitudes of the tactile cues are determined by the backdrive command algorithm.

9. The tiltrotor aircraft according to claim 8, wherein the variable drive rate is proportional to the error signal.

10. The tiltrotor aircraft according to claim 1, further comprising:

a one engine inoperative switch electrically coupled to the power lever;

a plurality of sensors disposed throughout the tiltrotor aircraft for sensing data for measured gas temperature, engine torque, transmission torque, the status of the one engine inoperative switch, and nacelle angle which is defined as the angle between a longitudinal axis of the tiltrotor assembly and the at least one wing member, the plurality of sensors generating signals corresponding to the sensed data;

a first backdrive command which is a function of the sensed data for the measured gas temperature, the status of the one engine inoperative switch, and the nacelle angle;

a second backdrive command which is a function of the sensed data for the engine torque and the nacelle angle; and a third backdrive command which is a function of the sensed data for the transmission torque and the nacelle angle;

wherein the tactile cue command is the most critical of the first backdrive command, the second backdrive command, or the third backdrive command, as determined by the at least one flight control computer, depending upon the operational state of the tiltrotor aircraft.

11. A tactile cueing system for use in an aircraft, the tactile cueing system comprising:

at least one flight control computer;

a power lever electrically coupled to the at least one flight control computer;

a plurality of sensors for generating signals corresponding to selected operating conditions of the aircraft;

a plurality of operational limits of the aircraft generated by the at least one flight control computer;

a means for generating tactile cues to the power lever;

wherein the magnitudes of the tactile cues are variable and automatically determined for all ambient ambient operating conditions by the at least one flight control computer.

12. The tactile cueing system according to claim 11, wherein the means for generating tactile cues comprises:

an electric motor electrically coupled to the at least one flight control computer;

a variable friction magnetic particle clutch coupled to the electric motor and the power lever;

control electronics electrically coupled to the electric motor and the variable friction magnetic particle clutch; and a position sensor coupled to the control electronics for sensing the position of the power lever;

wherein the electric motor and the variable friction magnetic particle clutch combine to generate the tactile cues to the power lever without the use of mechanical springs, the tactile cues being a spring-like frictional force on the power lever and a displacement of the power lever to a position within the operational limits.

13. The tactile cueing system according to claim 11, wherein the plurality of sensors for generating signals corresponding to selected operating conditions of the aircraft comprises:

a first sensor for sensing measured gas temperature;

a second sensor for sensing engine torque;

a third sensor for sensing transmission torque;

a fourth sensor for sensing nacelle angle which is the angle between a longitudinal axis of the tiltrotor assembly and the at least one wing member; and a fifth sensor for sensing the status of a one engine inoperative switch.

14. The tactile cueing system according to claim 11, wherein the tactile cues comprise:

a variable drive rate on the power lever; and a variable friction force on the power lever;

wherein the variable drive rate and the variable friction force resist movement of the power lever.

15. The tactile cueing system according to claim 14, wherein the variable drive rate is between about 0.08 inches per second and about 0.8 inches per second.

16. The tactile cueing system according to claim 14, wherein the variable friction force is between about zero pounds and about 3.0 pounds.

17. A method of reducing pilot workload in an aircraft, the method comprising the steps of:

providing a flight control computer;

coupling a power lever to the flight control computer;

providing operational limits for selected engine and drive system components;

providing a means for generating displacement and spring-like frictional tactile cues on the power lever in response to selected operating conditions of the aircraft;

generating the tactile cues on the power lever without the use of mechanical springs as the power lever approaches a position which represents operational limits of the aircraft, thereby reducing pilot workload; and continuously comparing the operational limits to the operating conditions of the aircraft, such that the tactile cues are generated on the power lever based upon the selected operating condition that is most critical relative to the respective operational limit.

18. The method according to claim 17, wherein the step of providing a means for generating tactile cues on the power lever comprises:

electrically coupling control electronics to the flight control computer;

electrically coupling an electric motor to the control electronics;

electrically coupling a variable friction magnetic particle clutch to the control electronics;

electrically coupling a position sensor to the control electronics;

coupling the position sensor to the power lever;

disposing a plurality of sensors on the aircraft;

sensing selected operational conditions of the aircraft with the plurality of sensors;

sensing the position of the power lever with the position sensor;

calculating with the flight control computer whether the position of the power lever would cause the aircraft to approach the operational limits of the aircraft; and generating the tactile cues to the power lever with the electric motor and the variable friction magnetic particle clutch if the position of the power lever would cause the aircraft to approach the operational limits of the aircraft.

19. The method according to claim 18, wherein the step of generating the tactile cues to the power lever comprises the step of:

imparting a variable drive rate of between about 0.08 inches per second and about 0.8 inches per second to the power lever.

20. The method according to claim 18, wherein the step of generating the tactile cues to the power lever comprises the step of:

imparting a variable friction force of between about zero pounds and about 3.0 pounds to the power lever.

* * * * *

UNITED STATES PATENT AND TRADEMARK OFFICE
CERTIFICATE OF CORRECTION

PATENT NO. : 6,695,264 B2
DATED : February 24, 2004
INVENTOR(S) : Joseph M. Schaeffer et al.

It is certified that error appears in the above-identified patent and that said Letters Patent is hereby corrected as shown below:

Drawings,
Please replace Drawing Sheets 1-14 with the attached 25 sheets of drawings.

Signed and Sealed this

Twenty-second Day of March, 2005

JON W. DUDAS
*Director of the United States Patent and Trademark Office*

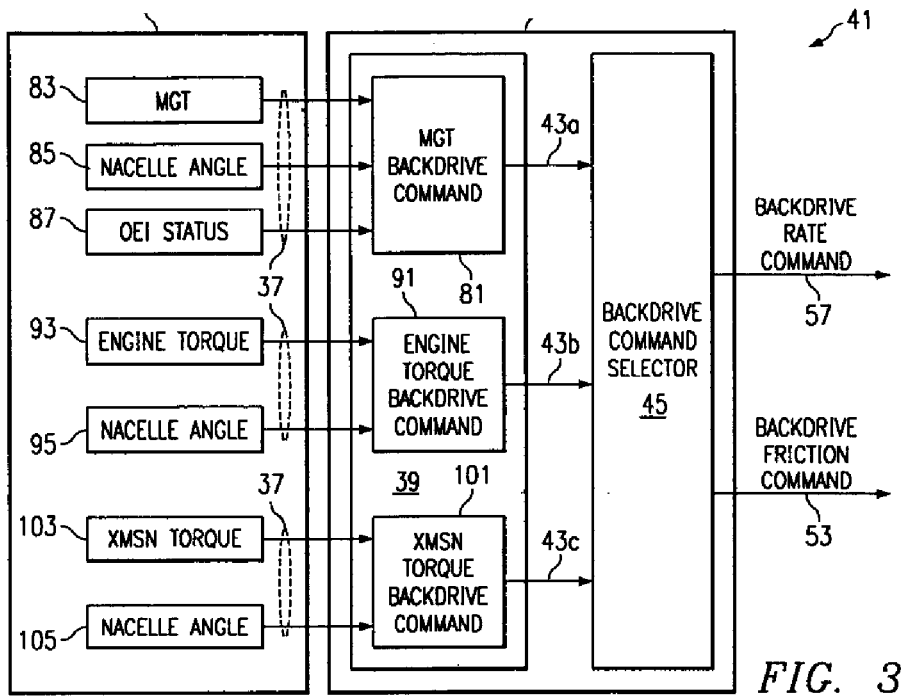

FIG. 3

| TABLE 1: MGT LIMITER AND BACKDRIVE ACTIVATION | | | |
|---|---|---|---|
| | MGT LIMITER | MGT BACKDRIVE ACTIVATION | TORQUE BACKDRIVE ACTIVATION |
| HELICOPTER/ CONVERSION AEO | 945 DEG C (30 SEC OEI) | 835 DEG C (TAKEOFF) | 100% XMSN Q (TAKEOFF) |
| HELICOPTER/ CONVERSION OEI | 945 DEG C (30 SEC OEI) | 945 DEG C (30 SEC OEI) | 30 SECOND TORQUE OEI ENGINE |
| HELICOPTER/ CONVERSION OEI, OEI SWITCH SELECTED | 890 DEG C (2 MINUTE OEI) | 890 DEG C (2 MINUTE OEI) | 2 MINUTE TORQUE OEI ENGINE |
| AIRPLANE, AEO | 890 DEG C (2 MINUTE OEI) | 805 DEG C (MAX CONTINUOUS) | 81.6% XMSN Q (MAX CONTINUOUS) |
| AIRPLANE, OEI | 890 DEG C (2 MINUTE OEI) | 870 DEG C (30 MINUTE OEI) | 2 MINUTE OEI ENGINE TORQUE |
| AIRPLANE, OEI, OEI SWITCH SELECTED | 870 DEG C (30 MINUTE OEI) | 870 DEG C (30 MINUTE OEI) | CONTINUOUS OEI ENGINE TORQUE |

FIG. 4

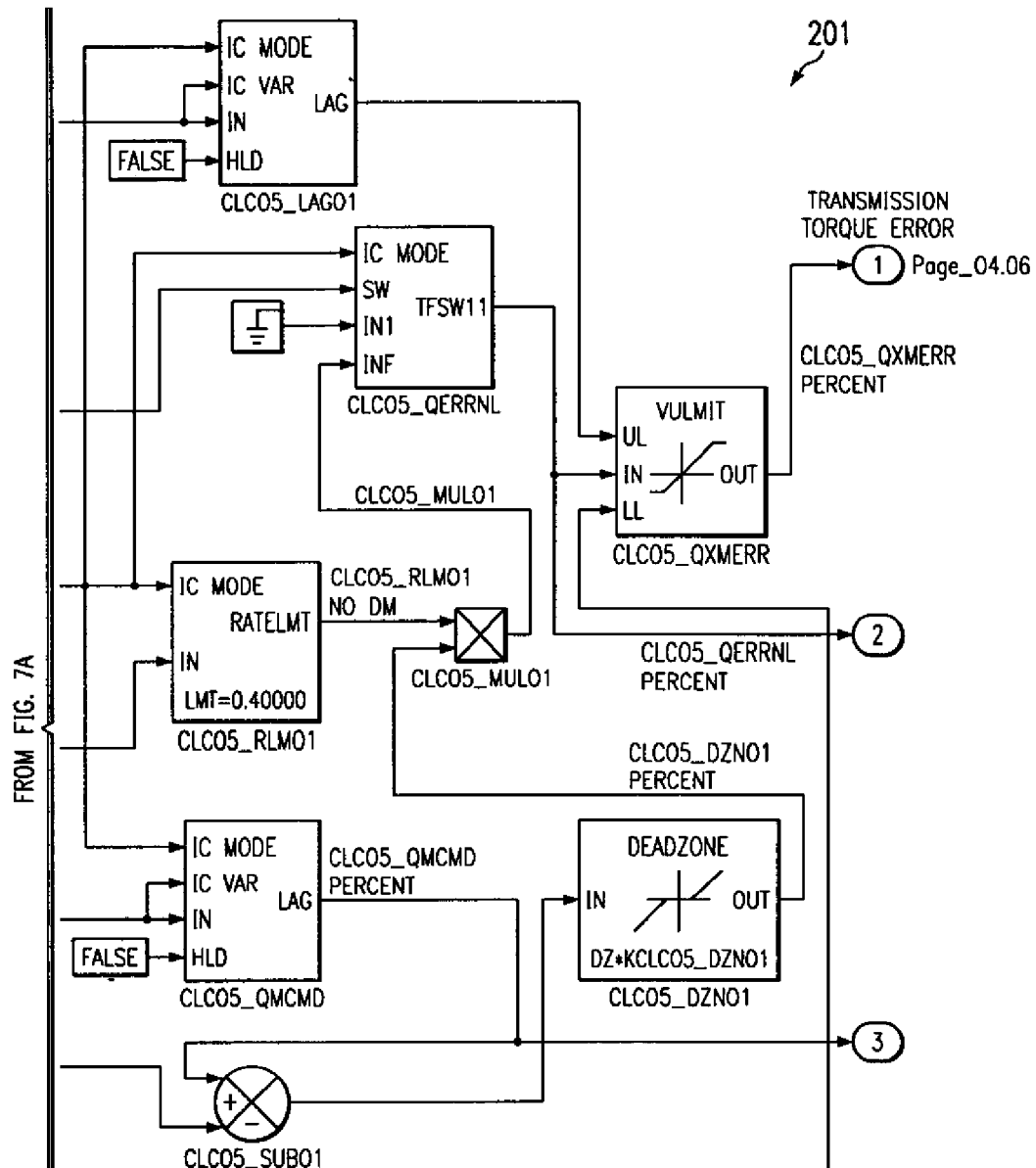

| Name : KCLE05_IDX01 | | Name : KCLE05_FNC01 | | Name : KCLE05_FNC02 | |
|---|---|---|---|---|---|
| Units : PERCENT | | Units : Percent/deg | | Units : Percent/deg | |
| Index | Value | Index | Value | Index | Value |
| 01 | 64 | 01 | 0.0416 | 01 | 0.275 |
| 02 | 67 | 02 | 0.0562 | 02 | 0.383 |
| 03 | 68 | 03 | 0.0514 | 03 | 0.411 |
| 04 | 70 | 04 | 0.0573 | 04 | 0.394 |
| 05 | 72 | 05 | 0.0558 | 05 | 0.374 |
| 06 | 73 | 06 | 0.0584 | 06 | 0.387 |
| 07 | 76 | 07 | 0.0593 | 07 | 0.384 |
| 08 | 79 | 08 | 0.0611 | 08 | 0.399 |
| 09 | 84 | 09 | 0.0348 | 09 | 0.249 |
| 10 | 86 | 10 | 0.0335 | 10 | 0.234 |
| 11 | 89 | 11 | 0.0195 | 11 | 0.135 |
| 12 | 92 | 12 | 0.006 | 12 | 0.143 |
| 13 | 94 | 13 | 0.0063 | 13 | 0.1537 |
| 14 | 96 | 14 | 0.0184 | 14 | 0.1377 |
| 15 | 98 | 15 | 0.0194 | 15 | 0.1368 |
| 16 | 100 | 16 | 0.0192 | 16 | 0.1309 |
| 17 | 102 | 17 | 0.0209 | 17 | 0.135 |
| 18 | 104 | 18 | 0.0171 | 18 | 0.115 |
| 19 | 106 | 19 | 0.0165 | 19 | 0.1033 |
| 20 | 108 | 20 | 0.0161 | 20 | 0.0967 |
| 21 | 110 | 21 | 0.0167 | 21 | 0.0975 |
| 22 | 112 | 22 | 0.0165 | 22 | 0.1005 |
| 23 | 115 | 23 | 0.0173 | 23 | 0.0952 |

| Name : KCLE05_FNC03 | | Name : KCLE05_FNC04 | |
|---|---|---|---|
| Units : Seconds | | Units : Percent/deg | |
| Index | Value | Index | Value |
| 01 | 4.0478 | 01 | 0.7804 |
| 02 | 4.816 | 02 | 0.7832 |
| 03 | 5.3618 | 03 | 0.7828 |
| 04 | 4.3736 | 04 | 0.7853 |
| 05 | 3.63 | 05 | 0.7837 |
| 06 | 3.7253 | 06 | 0.7823 |
| 07 | 3.377 | 07 | 0.786 |
| 08 | 3.1595 | 08 | 0.7857 |
| 09 | 1.6149 | 09 | 0.8123 |
| 10 | 1.7055 | 10 | 0.8084 |
| 11 | 1.2513 | 11 | 1.1472 |
| 12 | 0.1069 | 12 | 0.1835 |
| 13 | 0.1328 | 13 | 0.2092 |
| 14 | 0.4423 | 14 | 0.5409 |
| 15 | 0.4649 | 15 | 0.6317 |
| 16 | 0.4622 | 16 | 0.6598 |
| 17 | 0.4677 | 17 | 0.646 |
| 18 | 0.4498 | 18 | 0.6731 |
| 19 | 0.3858 | 19 | 0.7053 |
| 20 | 0.3759 | 20 | 0.7117 |
| 21 | 0.3746 | 21 | 0.7142 |
| 22 | 0.3936 | 22 | 0.708 |
| 23 | 0.3852 | 23 | 0.7181 |

Data Parameters for
Page_08.05_TLIML
KCLE05_BIS01 = 945
KCLE05_BIS02 = 890.
KCLE05_BIS03 = 890.
KCLE05_BIS04 = 870.
KCLE05_BIS05 = 108.1
KCLE05_TFS01 = 20.
KCLE05_TFS02 = 20.
KCLE05_TLIL = .02
KCLE05_GAN01 = 1.0
KCLE05_INT01 = 1.0
KCLE05_INT01_UL=999.
KCLE05_INT01_LL=-999.

*FIG. 7J*

| Name : KCLE06_IDX01 | | Name : KCLE06_FNCO1 | | Name : KCLE06_FNCO2 | |
|---|---|---|---|---|---|
| Units : PERCENT | | Units : Percent/deg | | Units : Percent/deg | |
| Index | Value | Index | Value | Index | Value |
| 01 | 64 | 01 | 0.0416 | 01 | 0.275 |
| 02 | 67 | 02 | 0.0562 | 02 | 0.383 |
| 03 | 68 | 03 | 0.0514 | 03 | 0.411 |
| 04 | 70 | 04 | 0.0573 | 04 | 0.394 |
| 05 | 72 | 05 | 0.0558 | 05 | 0.374 |
| 06 | 73 | 06 | 0.0584 | 06 | 0.387 |
| 07 | 76 | 07 | 0.0593 | 07 | 0.384 |
| 08 | 79 | 08 | 0.0611 | 08 | 0.399 |
| 09 | 84 | 09 | 0.0348 | 09 | 0.249 |
| 10 | 86 | 10 | 0.0335 | 10 | 0.234 |
| 11 | 89 | 11 | 0.0195 | 11 | 0.135 |
| 12 | 92 | 12 | 0.006 | 12 | 0.143 |
| 13 | 94 | 13 | 0.0063 | 13 | 0.1537 |
| 14 | 96 | 14 | 0.0184 | 14 | 0.1377 |
| 15 | 98 | 15 | 0.0194 | 15 | 0.1368 |
| 16 | 100 | 16 | 0.0192 | 16 | 0.1309 |
| 17 | 102 | 17 | 0.0209 | 17 | 0.135 |
| 18 | 104 | 18 | 0.0171 | 18 | 0.115 |
| 19 | 106 | 19 | 0.0165 | 19 | 0.1033 |
| 20 | 108 | 20 | 0.0161 | 20 | 0.0967 |
| 21 | 110 | 21 | 0.0167 | 21 | 0.0975 |
| 22 | 112 | 22 | 0.0165 | 22 | 0.1005 |
| 23 | 115 | 23 | 0.0173 | 23 | 0.0952 |

| Name : KCLE06_FNCO3 | | Name : KCLE06_FNCO4 | | Data Parameters for Page_08.06_TLIMR |
|---|---|---|---|---|
| Units : Seconds | | Units : Percent/deg | | KCLE06_BIS01 = 945 |
| Index | Value | Index | Value | KCLE06_BIS02 = 890 |
| 01 | 4.0478 | 01 | 0.7804 | KCLE06_BIS03 = 890. |
| 02 | 4.816 | 02 | 0.7832 | KCLE06_BIS04 = 870. |
| 03 | 5.3618 | 03 | 0.7828 | KCLE06_BIS05 = 108.1 |
| 04 | 4.3736 | 04 | 0.7853 | KCLE06_TFS01 = 20. |
| 05 | 3.63 | 05 | 0.7837 | KCLE06_TFS02 = 20. |
| 06 | 3.7253 | 06 | 0.7823 | KCLE06_TLIR = .02 |
| 07 | 3.377 | 07 | 0.786 | KCLE06_GAN01 = 1.0 |
| 08 | 3.1595 | 08 | 0.7857 | KCLE06_INTO1 = 1.0 |
| 09 | 1.6149 | 09 | 0.8123 | KCLE06_INTO1_UL=999. |
| 10 | 1.7055 | 10 | 0.8084 | KCLE06_INTO1_LL=-999. |
| 11 | 1.2513 | 11 | 1.1472 | |
| 12 | 0.1069 | 12 | 0.1835 | |
| 13 | 0.1328 | 13 | 0.2092 | |
| 14 | 0.4423 | 14 | 0.5409 | |
| 15 | 0.4649 | 15 | 0.6317 | |
| 16 | 0.4622 | 16 | 0.6598 | |
| 17 | 0.4677 | 17 | 0.646 | |
| 18 | 0.4498 | 18 | 0.6731 | |
| 19 | 0.3858 | 19 | 0.7053 | |
| 20 | 0.3759 | 20 | 0.7117 | |
| 21 | 0.3746 | 21 | 0.7142 | |
| 22 | 0.3936 | 22 | 0.708 | |
| 23 | 0.3852 | 23 | 0.7181 | |

*FIG. 7N*

FIG. 7T

Index name: KCLC08_IDX03
Interp name: KCLC08_FNC03

| Index | X Value | Y Value |
|---|---|---|
| 01 | 0.0 | 0.0625 |
| 02 | 1.0 | 0.10 |
| 03 | 2.0 | 0.30 |
| 04 | 3.0 | 0.65 |
| 05 | 4.0 | 0.80 |
| 06 | 5.0 | 1.00 |

Index name: KCLC08_IDX02
Interp name: KCLC08_FNC02

| Index | X Value | Y Value |
|---|---|---|
| 01 | 81.0 | 1.0 |
| 02 | 83.0 | 2.0 |
| 03 | 85.0 | 5.0 |
| 04 | 94.0 | 5.0 |
| 05 | 120.0 | 5.0 |

Index name: KCLC08_IDX01
Interp name: KCLC08_FNC01

| Index | X Value | Y Value |
|---|---|---|
| 01 | 99.0 | 0.0 |
| 02 | 100.0 | 1.0 |
| 03 | 101.0 | 2.0 |
| 04 | 104.0 | 5.0 |
| 05 | 130.0 | 5.0 |

Data Parameters for
Page_04.08_COLBND
KCLC08_BIS02 = .01
KCLC08_BIS03 = .50
KCLC08_BIS04 = .8
KCLC08_BIS06 = 0
KCLC08_BIS07 = 0
KCLC08_BIS08 = 100
KCLC08_BIS09 = 82.0
KCLC08_BIS10 = −2
KCLC08_BIS11 = 0
KCLC08_BIS12 = 2
KCLC08_BIS14 = 0
KCLC08_TFS02 = 2.0
KCLC08_TFS03 = 0.10
KCLC08_TFS04 = 0.10
KCLC08_BDRATE = 1.111
KCLC08_DEN01